(12) United States Patent  
Aughton et al.

(10) Patent No.: US 9,261,390 B2  
(45) Date of Patent: Feb. 16, 2016

(54) FLOW METER ASSEMBLY, GATE ASSEMBLIES AND METHODS OF FLOW MEASUREMENT

(71) Applicant: Rubicon Research Pty Ltd., Hawthorn, Victoria (AU)

(72) Inventors: David John Aughton, Hawthorn East (AU); Damien Vernon Pearson, Hawthorn (AU)

(73) Assignee: Rubicon Research Pty Ltd., Hawthorn, Victoria (AU)

( * ) Notice: Subject to any disclaimer, the term of this patent is extended or adjusted under 35 U.S.C. 154(b) by 0 days.

(21) Appl. No.: 14/553,963

(22) Filed: Nov. 25, 2014

(65) Prior Publication Data

US 2015/0082911 A1   Mar. 26, 2015

Related U.S. Application Data

(60) Division of application No. 13/870,857, filed on Apr. 25, 2013, now Pat. No. 8,893,560, which is a continuation of application No. 13/399,957, filed on Feb. 17, 2012, now Pat. No. 8,474,327, which is a continuation of application No. PCT/AU2010/001052, filed on Aug. 18, 2010.

(30) Foreign Application Priority Data

Aug. 18, 2009  (AU) ............................... 2009903893  
Oct. 22, 2009  (AU) ............................... 2009905149  
Jun. 2, 2010  (AU) ............................... 2010902414

(51) Int. Cl.  
*G01F 1/20* (2006.01)  
*G01F 1/66* (2006.01)  
(Continued)

(52) U.S. Cl.  
CPC . *G01F 1/667* (2013.01); *E02B 7/26* (2013.01); *E02B 7/40* (2013.01); *E05F 15/00* (2013.01); *G01F 1/002* (2013.01); *G01F 1/662* (2013.01)

(58) Field of Classification Search  
USPC ................ 73/861.02, 861.18, 861.27, 861.28  
See application file for complete search history.

(56) References Cited

U.S. PATENT DOCUMENTS 3,771,117 A   11/1973   Shaffer et al.  
3,869,915 A   3/1975    Baumoel  
(Continued)

FOREIGN PATENT DOCUMENTS

AU    2001283691    1/2008  
CN    201269765     7/2009  
(Continued)

OTHER PUBLICATIONS

ASTM International, "Standard Test Method for Open-Channel Flow Measurement by Acoustic Velocity Meter Systems," Document No. D5389-93, Section 13.1.3, 2007.

(Continued)

*Primary Examiner* — Jewel V Thompson  
(74) *Attorney, Agent, or Firm* — Sheppard, Mullin, Richter & Hampton LLP

(57) ABSTRACT

The present invention provides an acoustic flow meter assembly (2) for pipes or open channels, said assembly including a frame (24) with a predetermined geometry. The frame has at least one user accessible port (36-42) with the at least one user accessible port (36-42) adapted to receive an interchangeable cartridge (44) which contains at least one acoustic transducer (46) to measure fluid velocity through said frame (24).

14 Claims, 32 Drawing Sheets

(51) Int. Cl.
*E02B 7/26* (2006.01)
*E02B 7/40* (2006.01)
*G01F 1/00* (2006.01)
*E05F 15/00* (2015.01)

(56) References Cited

U.S. PATENT DOCUMENTS

| | | | |
|---|---|---|---|
| 4,162,630 A | | 7/1979 | Johnson |
| 4,183,244 A | | 1/1980 | Kohno et al. |
| 4,350,916 A | * | 9/1982 | August ............... H03H 3/08 310/313 B |
| 4,462,261 A | * | 7/1984 | Keyes ............... G01F 1/86 73/861.02 |
| 4,483,200 A | | 11/1984 | Togawa et al. |
| 4,726,709 A | | 2/1988 | Labelle |
| 4,762,012 A | | 8/1988 | Brown |
| 5,179,862 A | | 1/1993 | Lynnworth |
| 5,461,931 A | | 10/1995 | Gill |
| 5,705,753 A | | 1/1998 | Hastings et al. |
| 5,905,207 A | | 5/1999 | Schalk |
| 6,327,915 B1 | | 12/2001 | Van Cleve et al. |
| 6,895,825 B1 | | 5/2005 | Barkhoudarian |
| 7,044,000 B2 | * | 5/2006 | Feller ............... G01F 1/66 73/597 |
| 7,481,114 B2 | | 1/2009 | Lynnworth |
| 8,091,435 B2 | | 1/2012 | Will et al. |
| 8,291,773 B2 | | 10/2012 | Dietz et al. |
| 2003/0084732 A1 | | 5/2003 | Ehrlich et al. |
| 2004/0009041 A1 | | 1/2004 | Aughton et al. |
| 2009/0095088 A1 | | 4/2009 | Berger et al. |

FOREIGN PATENT DOCUMENTS

| | | |
|---|---|---|
| DE | 102006001074 | 7/2007 |
| GB | 465004 | 4/1937 |
| GB | 692075 | 5/1953 |
| JP | 4361121 | 12/1992 |
| JP | 2000346686 | 12/2000 |
| JP | 2005049181 | 2/2005 |
| KR | 100749721 | 8/2007 |
| WO | 9724585 | 7/1997 |
| WO | 0003206 | 1/2000 |
| WO | 0216698 | 2/2002 |
| WO | 02071163 | 9/2002 |
| WO | 2008101662 | 8/2008 |
| WO | 2010076152 | 7/2010 |
| WO | 2010088731 | 8/2010 |

OTHER PUBLICATIONS

Imperial Irrigation District, "Efficiency Conservation Definite Plan: IID Delivery System Analyses (vol. I)—Technical Appendices 1.A. through 1.G.," May 2007 [retrieved from http://www.iid.com/Modules/ShowDocument.aspx? documentid=804 on Aug. 22, 2012].

Imperial Irrigation District, "IID Efficiency Conservation Definite Plan: Board Workshop #3—Alternative Analysis and Recommendations," Apr. 2, 2007 [retrieved from http://www.iid.com/Modules/ShowDocument.aspx?documentid=4434 on Aug. 22, 2012].

International Application No. PCT/AU2010/001052, International Search Report and Written Opinion mailed Oct. 29, 2010.

Australian Patent Application No. 2010283959, Patent Examination Report No. 1 mailed Dec. 6, 2013.

Chinese Patent Application No. 201080046936.8, Office Action mailed Feb. 21, 2013.

Chinese Patent Application No. 201080046936.8, Second Office Action mailed Dec. 27, 2013.

New Zealand Patent Application No. 598472, Examination Report mailed Nov. 1, 2012.

New Zealand Patent Application No. 598472, Further Examination Report mailed Aug. 21, 2013.

New Zealand Patent Application No. 613848, First Examination Report mailed Aug. 5, 2013.

\* cited by examiner

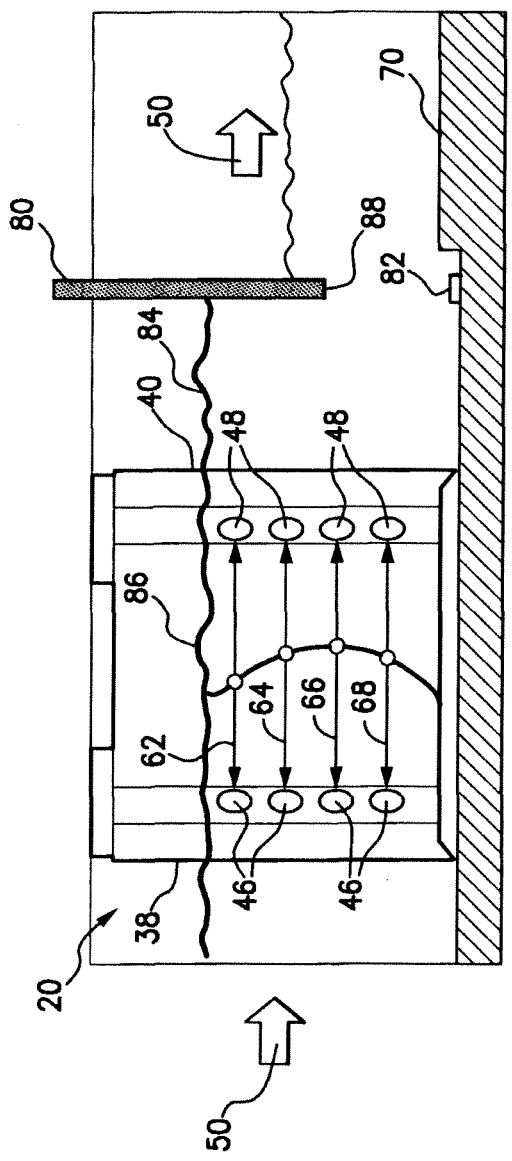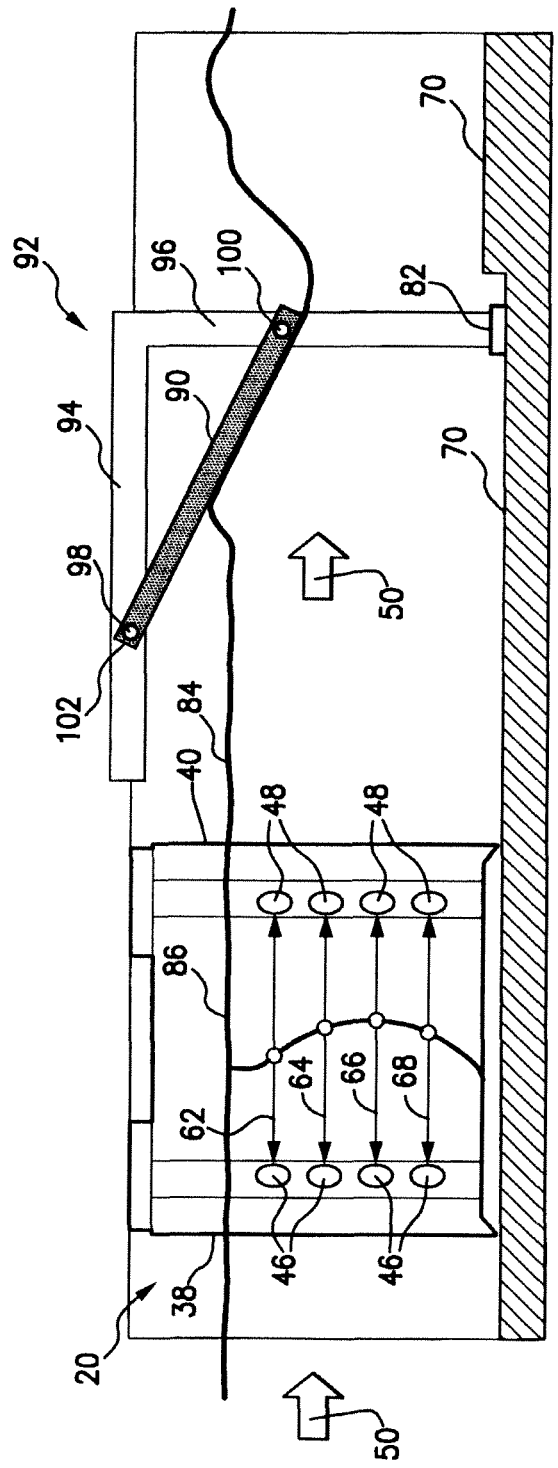

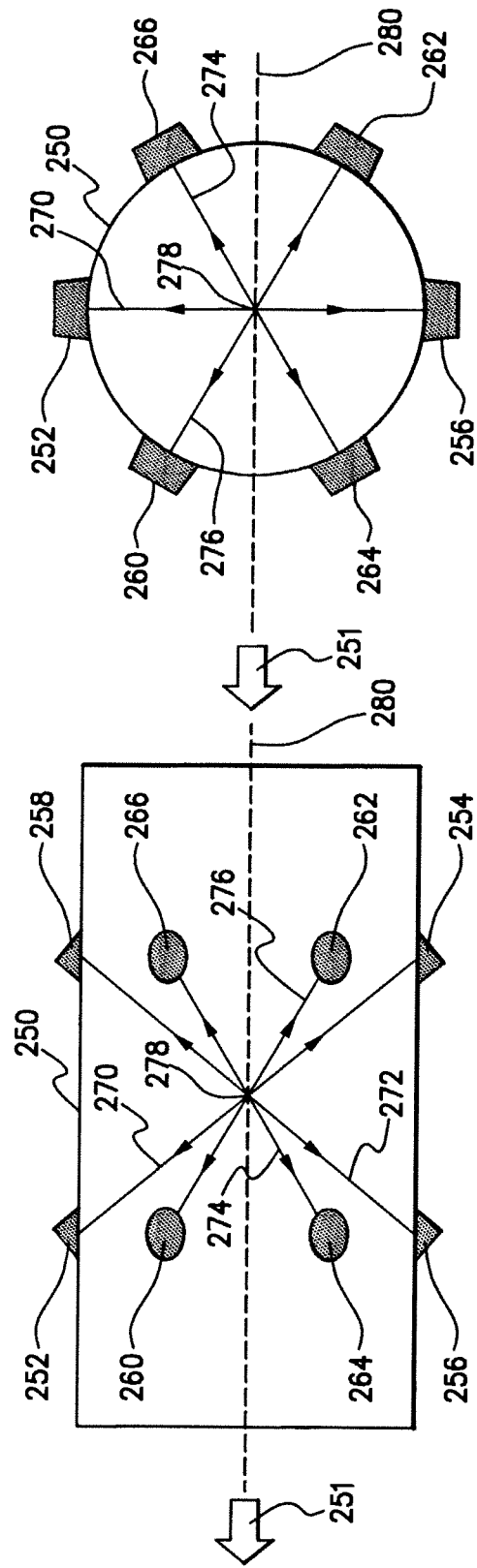

SECTION A-A

DETAIL B

SECTION A-A

SECTION B-B

DETAIL E

DETAIL D

CROSS SECTION OF A RIVER OR A CHANNEL SHOWING
THE VERTICAL POSITIONING OF THE SENSORS

FLOW METER ASSEMBLY, GATE ASSEMBLIES AND METHODS OF FLOW MEASUREMENT

CROSS-REFERENCE TO RELATED APPLICATIONS

This application is a divisional of U.S. patent application Ser. No. 13/870,857, filed Apr. 25, 2013 and entitled "Flow Meter Assembly, Gate Assemblies and Methods of Flow Measurement," which is a continuation of U.S. patent application Ser. No. 13/399,957, filed Feb. 17, 2012 and entitled "Flow Meter Assembly, Gate Assemblies and Methods of Flow Measurement, now U.S. Pat. No. 8,474,327," which is a continuation of International Application No. PCT/AU2010/001052 filed Aug. 18, 2010 and published as WO 2011/020143 A1, entitled "Flow Meter Assembly, Gate Assemblies and Methods of Flow Measurement," which claims priority to Australian Patent Application Serial No. 2009903893, filed Aug. 18, 2009, Australian Patent Application Serial No. 2009905149, filed Oct. 22, 2009, and Australian Patent Application Serial No. 2010902414, filed Jun. 2, 2010. All of the foregoing applications are hereby incorporated by reference herein.

FIELD OF THE INVENTION

This invention relates to an acoustic flow meter assembly for pipes or open channels and relates particularly, though not exclusively, to an acoustic flow meter assembly for monitoring water flow. The invention also relates to an undershot gate leaf assembly which may be used with the acoustic flow meter assembly.

DESCRIPTION OF THE PRIOR ART

Flow meters are commonly used to measure the flow rate of fluids within buried pipes and open channels or culverts. Transit time acoustic flow meters are an established measurement technology. When flow meters are installed in pipes which are below ground, servicing requirements mean that these flow meters are traditionally installed within a buried meter pit, typically a concrete box construction. The pit is typically accessible so that technicians may access the components of the flow meter. The construction and installation of these service pits is generally a high proportion of the total flow meter installation cost.

When ultrasonic (transit time) flow meters are installed in open channels and pipes they are typically installed as a collection of sub-components which must be assembled and then calibrated to their installation. The commissioning of these metering systems requires the precise measurement of the path length between each transducer, the angle of the measurement path relative to the mean direction of flow, and of water level transducer datum's and other meter configuration parameters. Other acoustic flow meter products available in the marketplace are assembled on site by strapping the acoustic transducers around the external or internal diameter of the pipe which passes the flow. In open conduit applications the transducers are bolted to the opposing walls of the conduit. The transducers are connected by signal cables to processor electronics. The assembly must be precision installed and calibrated in the field. For installations in which the transducers are installed on the internal diameter of the pipe, the pipe must be of sufficient diameter that a person may safely access it for the purpose of installation. For installations in which the transducers are installed on the outer diameter of the pipe, the pipe must be above ground or a large concrete pit must be constructed around the pipe to permit a person to safely access the external diameter for the purpose of fitting and maintaining the sensors.

In open channel flow meter applications, the accuracy of the flow meter is affected by the flow meter surroundings. The geometry of the channel upstream and downstream of the flow meter can influence the velocity distribution of the fluid passing through the flow meter. This velocity distribution is measurable at all points within the flow meter except for the surface. The velocity of the fluid on the floor/walls of the flow meter is zero. The velocity at set elevations within the flow meter can be measured, and the velocity at elevations between these measurements can be interpolated from the measured elevation velocities. However generally the surface velocity of the flow is not measured and so the velocity distribution in the upper levels of the flow must be extrapolated with potentially high uncertainty. To minimise the uncertainty in the surface velocity of the flow, the variation in surface velocity behaviour needs to be minimised.

OBJECTS OF THE INVENTION

It is an object of the present invention to reduce the infrastructure costs of a flow meter installation to allow installation of more flow meters which provide more data to be gathered to locate distribution system losses.

A further object of the invention is to provide a flow meter which completely defines its own geometry and does not require calibration to its installation or surroundings.

In another object of the invention there is provided an undershot flow gate which influences the flow profile to create non-turbulent, streamlined and repeatable flow behaviour.

Yet another object of the invention is to provide a flow meter, for use in a closed conduit, which includes a gate valve or the equivalent, but without what is referred to as a "bonnet" of the type which constitute an integral component of a traditional gate valve.

SUMMARY OF THE INVENTION

With these objects in view the present invention provides an acoustic flow meter assembly for pipes or open channels, said assembly including a frame with a predetermined geometry, said frame including at least one user accessible port, said at least one user accessible port adapted to receive an interchangeable cartridge which contains at least one acoustic transducer to measure fluid velocity through said frame.

Preferably the acoustic flow meter assembly further includes a plurality of user accessible ports with an associated cartridge. The user accessible ports may be located in corners of a rectangular or square orientation formed by said frame. Preferably a pair of cartridges are diagonally directed towards each other.

In a preferred embodiment each cartridge includes a plurality of acoustic transducers for measuring flow at predetermined depths. The acoustic flow meter assembly may further include a hollow tube for coupling at either end to a pipeline to determine the velocity through said pipeline. In a practical embodiment each transducer is located at one end of a respective sound transmission tube and the other end opens into said hollow tube. Each sound transmission tube can be associated with a respective cartridge and angled towards an associated facing sound transmission tube. Each sound transmission tube may contain fluid from said hollow tube. Each sound transmission tube may contain still fluid which is not in the path of the fluid flow.

In a further embodiment each sound transmission tube is filled with an acoustic transmissive material. The acoustic flow meter assembly may further include a boundary interface between the fluid in said sound transmission tube and the flowing fluid, said boundary interface formed of a material of suitable acoustic properties to enable ready transmission of the acoustic signals. The fluid in the sound transmission tubes may also be contained in a sealed well such that the fluid couples the transducers to the inner face of the sound transmission tubes.

The invention may also provide a tilt lift gate assembly including a gate member which can be raised and lowered from a vertically closed position through to a substantially horizontal disposition, said gate member being pivotally mounted at the top end thereof to a mechanism for pulling said gate member inwardly from the vertically closed position to the substantially horizontal disposition and at least one extension projecting from said gate member with a pivot point at the end of said at least one extension, said pivot point co-operating with a downwardly angled guide means whereby movement of said gate member does not cross said downwardly angled guide means.

It is preferred that a pair of extensions are located on each side of said gate member which co-operate with respective downwardly angled guide means. The tilt lift gate assembly may be located in an open fluid channel, said at least one extension being positioned substantially two thirds of the depth of the fluid.

The invention may also provide an open channel fluid velocity system for measuring the fluid velocity of the fluid flowing through said system, said system including an open channel containing said flowing fluid, an acoustic flow meter assembly as previously described and a tilt lift gate assembly as previously described downstream of said acoustic flow meter assembly, wherein said gate member predictably influences the surface velocity of said flowing fluid.

The invention may also provide an open channel fluid velocity system for measuring the fluid velocity of the fluid flowing through said system, said system including an open channel containing said flowing fluid, an acoustic flow meter assembly as previously described and an undershot gate downstream of said acoustic flow meter assembly, wherein said gate allows the fluid level in front of said gate to back to provide a uniform depth of fluid through said acoustic flow meter assembly.

The invention may also provide a method of measuring fluid velocity in a pipe or open channel, said method including the steps of: providing a timing circuit which includes a first circuit having at least one upstream acoustic transducer and a second circuit having at least one downstream acoustic transducer, measuring the time delay in detecting the acoustic signal from said at least one upstream acoustic transducer to said at least one downstream acoustic transducer from said first circuit, measuring the time delay in detecting the acoustic signal from said at least one downstream acoustic transducer to said at least one upstream acoustic transducer from said second circuit, measuring the time delay in said first circuit when said at least one upstream acoustic transducer is bypassed in said first circuit, measuring the time delay in said second circuit when said at least one downstream acoustic transducer is bypassed in said second circuit, and calculating the fluid velocity using said measurements.

In yet a further aspect of the invention there may be provided an acoustic flow meter for a pipe, said assembly including at least three pairs of acoustic transducers, each pair of said acoustic transducers located on opposing sides of said pipe and offset longitudinally along said pipe to provide upstream and downstream transducers, each pair of acoustic transducers, in use, having their acoustic paths intersecting at a point along the axis of said pipe to provide redundancy in measuring flow through said pipe if one of said acoustic transducers should fail.

The invention also provides a lift gate assembly including a gate member associated with a frame and which can be raised and/or lowered from between respective closed and open configurations, said frame having associated therewith and upstream thereof an apparatus for measuring transit turn of fluid, said apparatus being in the form of a conduit having one or more opposed pairs of acoustic transducers or the like associated therewith.

In another aspect there is provided a method of measuring acoustic transit times in an open channel or river, said method including the steps of: providing a first circuit having at least one upstream acoustic transducer on one side of said open channel or river and a second circuit having at least one downstream acoustic transducer on the opposite side of said open channel or river, said first and second circuits including respective timing circuitry which are not synchronised with one another, each of said timing circuits measuring their respective signal transmit and receive events, at least one of said first or second circuits including an RF or laser to provide synchronising signals between said first and second circuits, an RF or laser synchronising signal is transmitted between said first and second circuits prior to an acoustic signal transmitted from one of said acoustic transducers between said first and second circuits whereby said RF or laser synchronising signal allows synchronisation between the respective timing circuitry of said first and second circuits of said acoustic signal.

BRIEF DESCRIPTION OF THE DRAWINGS

In order that the invention may be more readily understood and put into practical effect, reference will now be made to the accompanying drawings, in which:

FIG. 6b is a cross-sectional view along and in the direction of arrows A-A of FIG. 6a;

FIG. 10 is a similar view to that of FIG. 6A but showing the embodiment of the acoustic flow meter assembly shown in FIG. 7 being used in combination with a vertically raiseable undershot gate leaf for controlling water flow;

FIG. 11 is a similar view to that of FIG. 10 but having a rotatable undershot gate leaf;

FIG. 26 is a side view of a pipe showing a further embodiment of the invention for the measurement of fluid velocity in a pipe;

FIG. 27 is an end view of FIG. 26;

DESCRIPTION OF THE PREFERRED EMBODIMENTS

Figure 1:
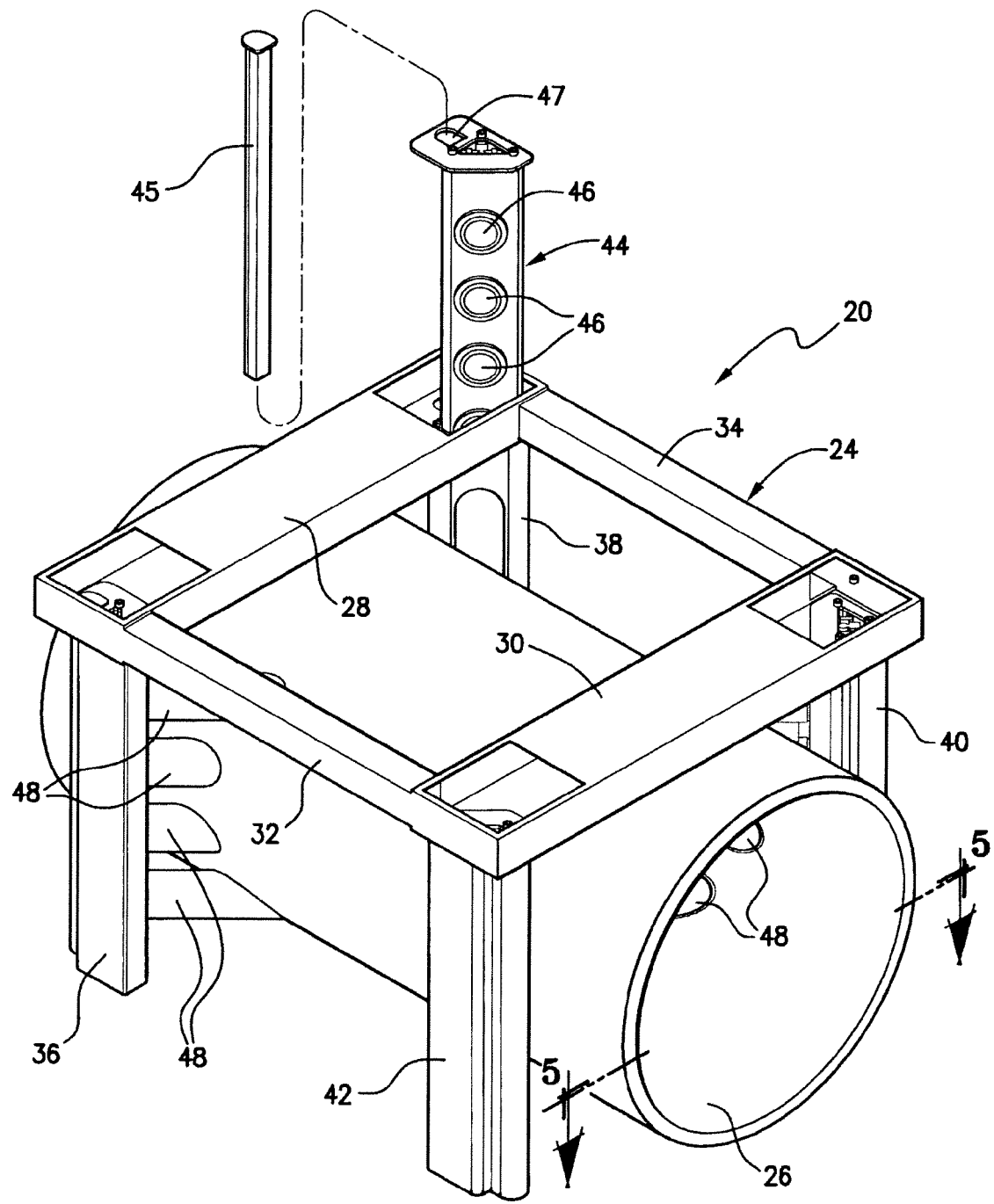
FIG. 1 is an exploded perspective view of a first embodiment of an acoustic flow meter assembly for a pipe made in accordance with the invention.

Throughout this specification the same reference numerals will be utilised, where applicable, to avoid repetition and duplication of description across all embodiments. The description of constructions and operation will be equally applicable.

In FIGS. 1 to 6 of the drawings there is shown an acoustic flow meter assembly 20 which is adapted to be fitted between a pipeline (not shown) through which fluid flows, preferably a liquid. In this embodiment the fluid is water but the invention is not limited to such an environment. The preferred embodiments are particularly useful for the metering of irrigation water consumption in irrigation channels in international irrigated agriculture regions and the metering of urban water supplies in international urban water networks. The acoustic flow meter 20 is buried in the ground 22 (FIG. 2) and includes a frame 24 which supports a pipe section 26. Pipe section 26 is adapted to be coupled to either end of the pipeline through which the flow rate is to be determined. Frame 24 in this embodiment is basically of a square shape and has two end members 28, 30 and two side members 32, 34. The shape and construction of the frame 24 can vary to suit the requirements of the particular flow meter assembly. Four hollow legs 36, 38, 40 and 42 form part of the frame 24 and slidably receive cartridges 44 which can be inserted therein. The number and positioning of the cartridges 44 can vary depending on the environment in which flow rate is to be determined. In this embodiment each cartridge includes four acoustic transducers 46. The number and positioning of the acoustic transducers 46 can also be varied. The acoustic transducers 46 are integrated into electronic circuitry (not shown) which can be included in the cartridges 44 and frame 24. The serviceable components including the acoustic transducers 46 and processing electronics are all contained within sealed cartridges 44 which can be interchanged. Typically, the cartridges 44 can provide their measurements by wired or wireless means to an external computing device.

Figure 2:
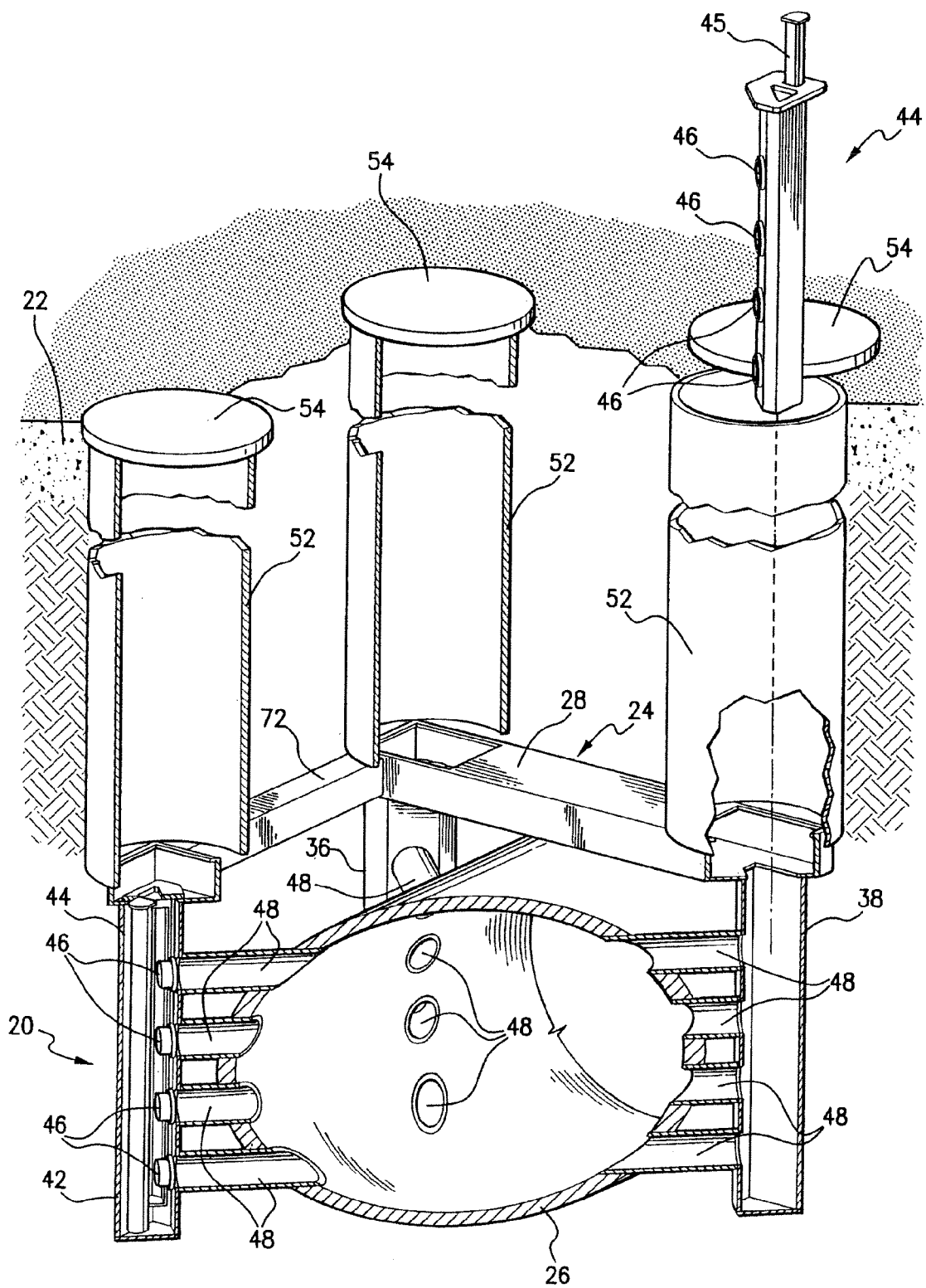
FIG. 2 is a diagonal cross-sectional view of the acoustic flow meter assembly shown in FIG. 1 in its buried position in the ground.
Figure 3:
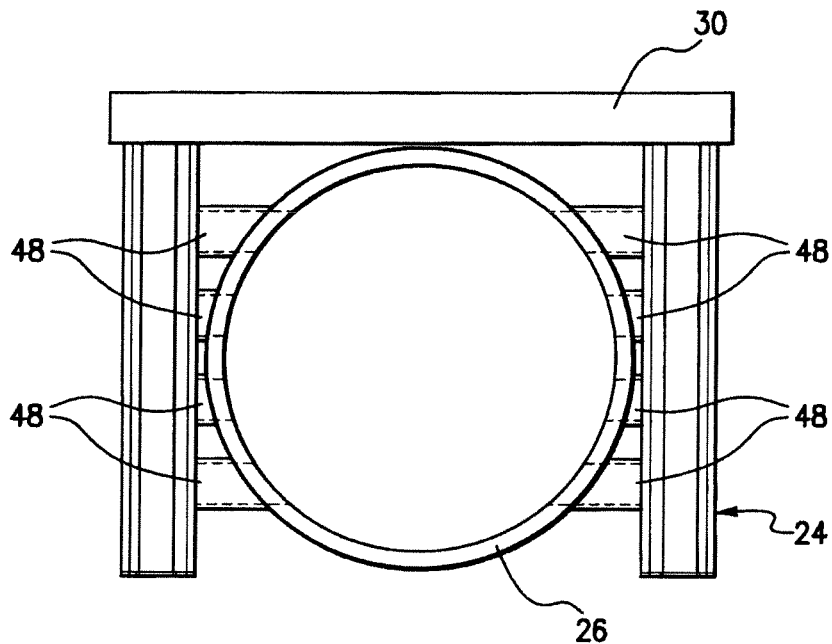
FIG. 3 is a front view of the acoustic flow meter assembly shown in FIG. 1.
Figure 4:
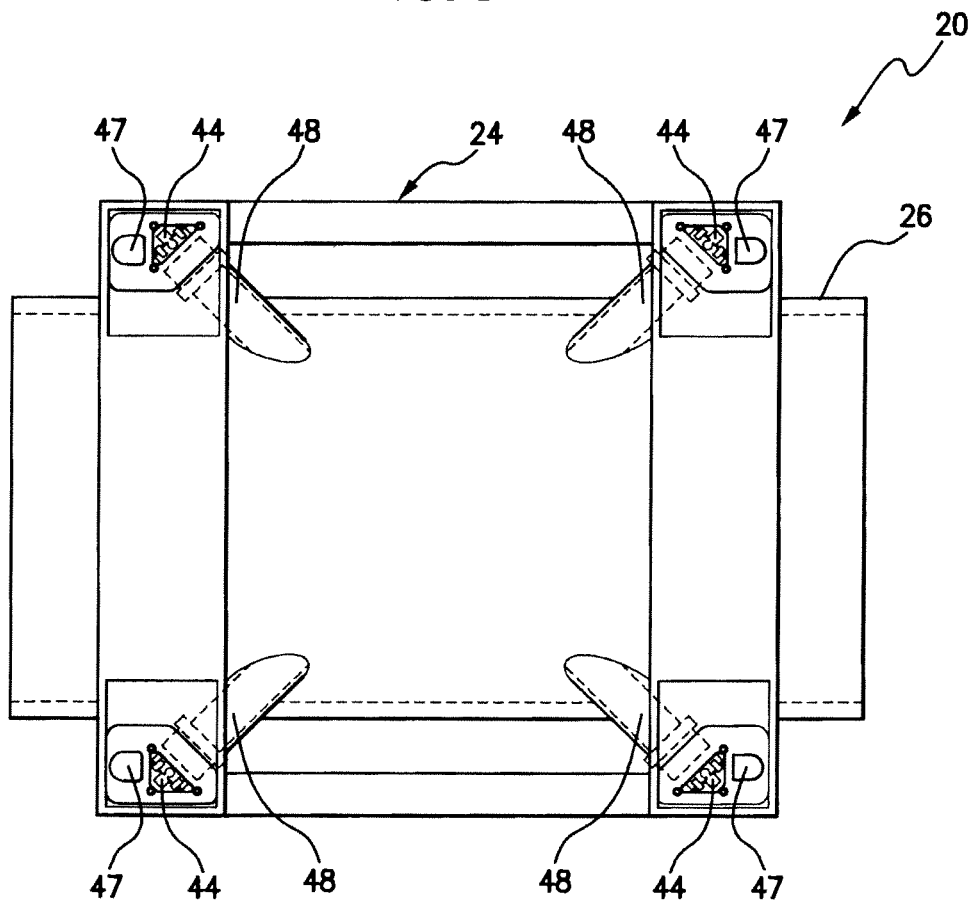
FIG. 4 is a plan view of the acoustic flow meter assembly shown in FIG. 1.
Figure 5A:
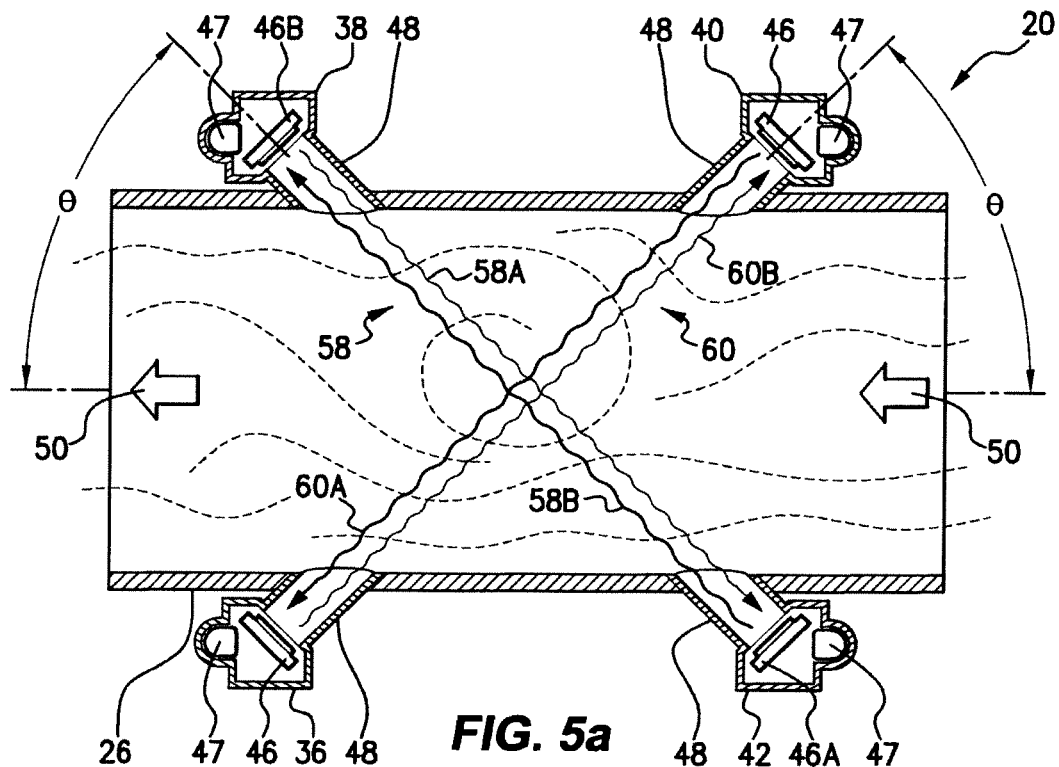
FIG. 5a is a longitudinal cross-sectional view along and in the direction of arrows 5-5 of the acoustic flow meter assembly shown in FIG. 1 showing water flow.

Pipe section 26 has number of sound transmission tubes 48 which are mounted in a horizontal disposition as clearly shown in FIGS. 2 and 3. The sound transmission tubes 48 are typically cylindrical in shape and are made of an acoustically transmissive material which couples the aligned acoustic transducers 46 to the internal bore of the pipe section 26. The sound transmission tubes 48 are arranged to intersect the pipe section 26 at an angle θ (FIG. 5a) to the direction of fluid flow 50. The preferred intersection angle θ is 45 degrees, however other implementations could be manufactured with an intersection angle θ between 0 and 90 degrees to suit geometry requirements of various applications. The sound transmission tubes 48 provide an acoustic path for the acoustic transducers 46 located within the flow meter cartridges 44. In FIG. 5a the sound transmission tubes 48 are hollow so that they contain the fluid within the pipe section 26 and the sound propagates through this fluid only. The sound transmission tubes 48 will contain still water and will not be in the path of the water flow.

Figure 5B:
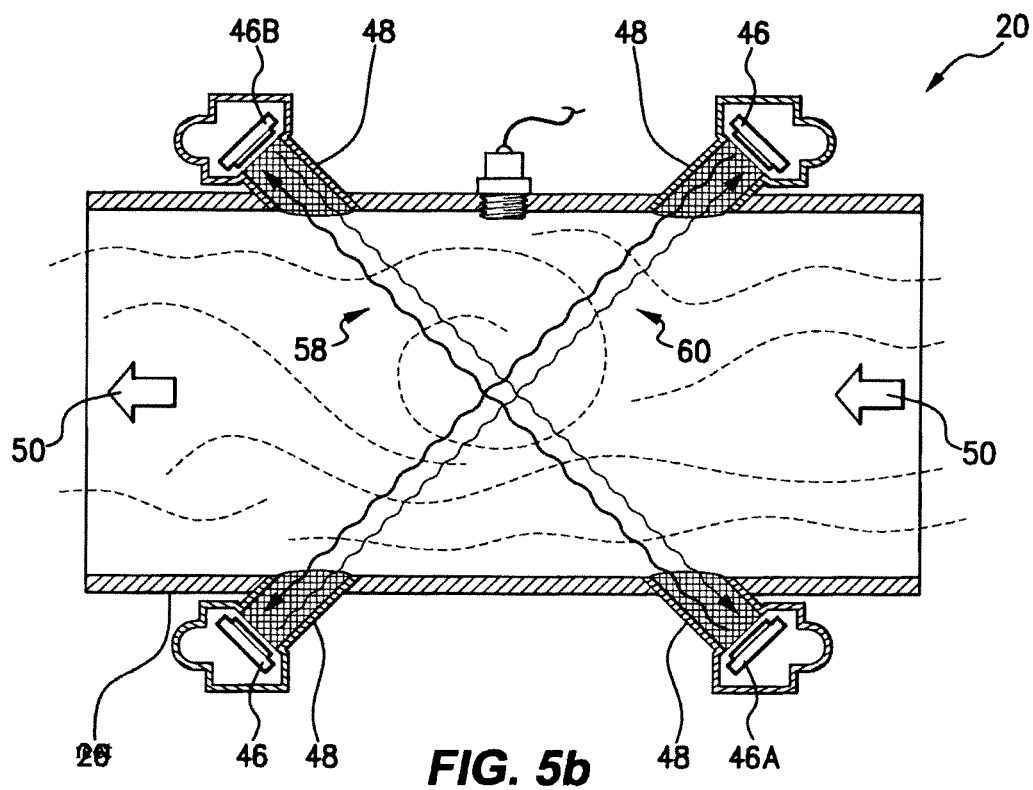
FIG. 5b is a similar view to that of FIG. 5a with filled sound transmission tubes.

Alternatively, as shown in FIG. 5b, the sound transmission tubes 48 may be filled or plugged with a solid material of appropriate acoustic behaviour so that the pipe section 26 is completely sealed and the cartridges 44 may be retrieved while the pipe is operating under a positive or negative pressure without the requirement to seal access ports 52 against this pressure. The sound transmission tubes 48 could also be filled with water with a boundary interface (not shown) between the still water in the sound transmission tubes 48 and the flowing water. This interface would be made of a material of appropriate acoustic properties that enables the ready transmission of the acoustic signals. An advantage of this embodiment with the closed sound transmission tubes 48 is that the internal bore of the pipe section 26 will be smooth and there will be no potential for clogging or trapping of debris in the pipe section 26 or the sound transmission tubes 48. In this arrangement a good acoustic coupling would be achieved between the acoustic transducers 46 contained within the cartridges 44 and the end faces of the sound transmission tubes 48 by employing a camming mechanism within the access ports 52 which would positively engage the acoustic transducers 46 against the faces of the sound transmission tubes 48.

Alternatively, a simpler coupling mechanism can be achieved by filling access ports 52 with water or similar fluid which acoustically couples the transducers 46 contained within cartridges 44 to the end faces of the sound transmission tubes 48. In this implementation, the access ports 52 are a sealed well containing a fluid which couples the transducers 46 to the inner face of the sound transmission tubes 48. The access ports 52 are typically aligned vertically and accessed through sealed lids 54 at ground level. In some applications the access ports 52 might be aligned horizontally and accessed through wall mounted lids. The access ports may be installed at any other angle as the installation requires.

Figure 6A:
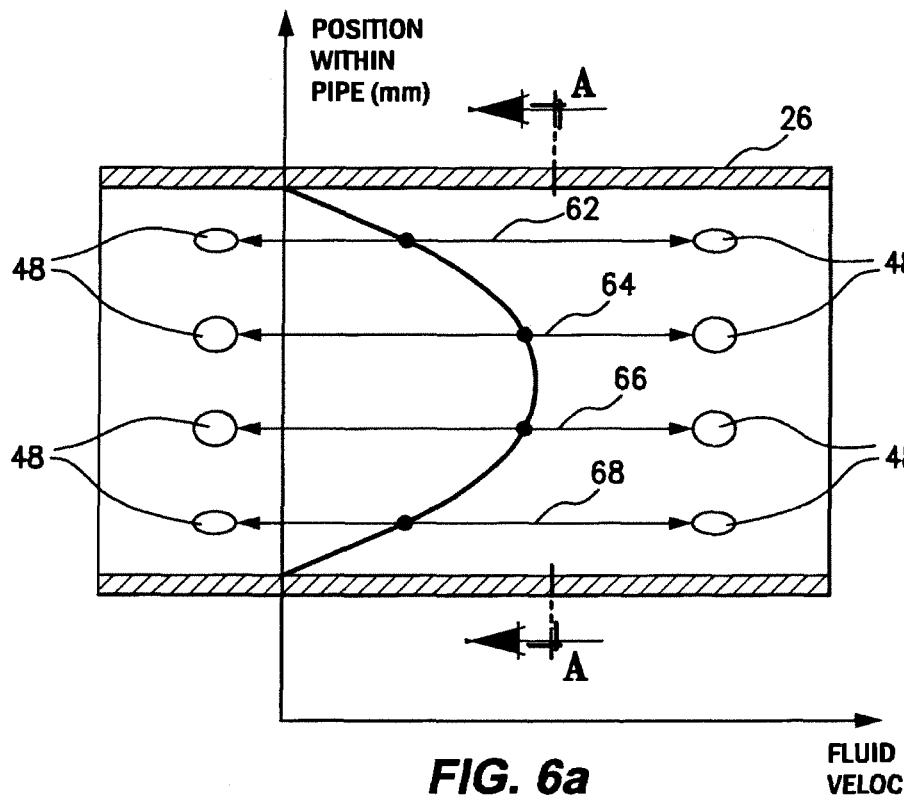
FIG. 6a is longitudinal view of water flow showing the velocity profile.
Figure 6B:
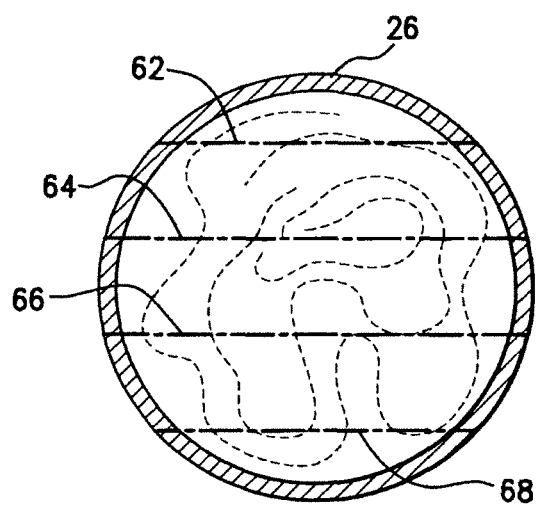

Within a horizontal plane of the acoustic flow meter assembly 20 there are four acoustic transducers 46, which are arranged to provide two acoustic paths 58, 60 within each horizontal plane (FIGS. 5a and 5b). As there are four acoustic transducers in each cartridge 44 there will be four horizontal planes 62, 64, 66 and 68 (FIGS. 6a and 6b). These acoustic paths are at right angles to each other, and this arrangement eliminates cross flow errors as discussed in Section 13.1.3 of ASTM D5389-93 (2007) Standard Test Method for Open-Channel Flow Measurement by Acoustic Velocity Meter Systems.

The acoustic transducers 46 transmit a high frequency (in the kilohertz to megahertz range) sound pulse across the pipe section 26. The travel time of the acoustic signal is measured in a direction upstream to the direction of flow 50, and also in a direction downstream to the direction of flow 50 as seen in FIGS. 5a and 5b. The flow velocity creates a difference in the sound wave travel times in the upstream and downstream direction. This travel time difference is recorded and used to determine the average velocity of the fluid along the line of the acoustic path. The four measurement paths provide an average velocity of the fluid at four different planes 62-68 as shown in FIG. 6a. The velocity distribution within the pipe section 26 is then calculated from the velocities at each of the four planes 62-68 using a calibrated mathematical relationship.

A water level sensor, preferably an acoustic water level sensor 45, will be associated with each cartridge 44. In the preferred embodiments of FIGS. 1 to 10, for example, each cartridge 44 includes a port, generally designated 47, for receiving and releasably retaining an acoustic water level sensor 45. It should be understood, however, that it is not essential for the water level sensor to be physically integrated into or with the associated cartridge 45, so long as a water level sensor is located at or in the vicinity of each cartridge 44.

The water level sensors 45 function to provide an accurate measurement of the profile of the water surface at or in the vicinity of the overall flow meter assembly. Since a measurement is being made of the average velocity of flow of the water, then in order to be able to accurately compute the volumetric flow rate an accurate measurement of the cross-sectional area of flow at the location of the flow meter assembly is also required.

The preferred arrangements as illustrated and described, with an acoustic water level sensor 45 associated with each of the four cartridges 44, ensures an accurate determination of volumetric flow of water, even in situation/circumstance wherein the surface of the water is disturbed or uneven, as for example with there being turbulent flow or, in the alternative, a sloping surface gradient.

Other embodiments may include any number and combination of acoustic transducers 46, as required, to realise other signal path configurations. The use of signal reflectors to replace some of the transducers in each measurement plane could also be used. It is not necessary to have four planes 62-68 across the acoustic flow meter assembly 20. Any number of planes may be used, for example, one or a plurality of planes. The planes need not be horizontal as shown in this embodiment.

Figure 7:
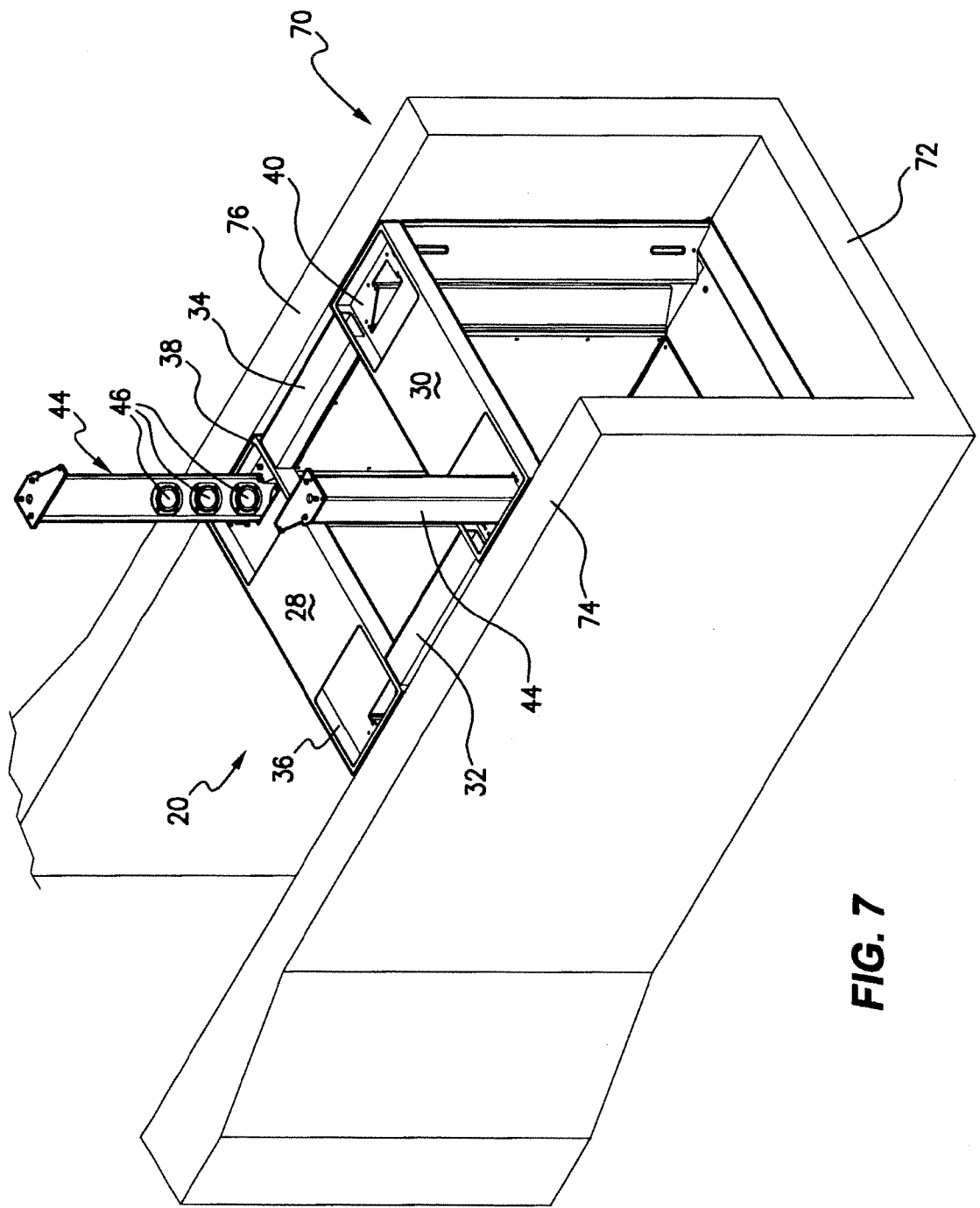
FIG. 7 is a perspective view of a second embodiment of an acoustic flow meter assembly for use in an open channel environment.
Figure 8:
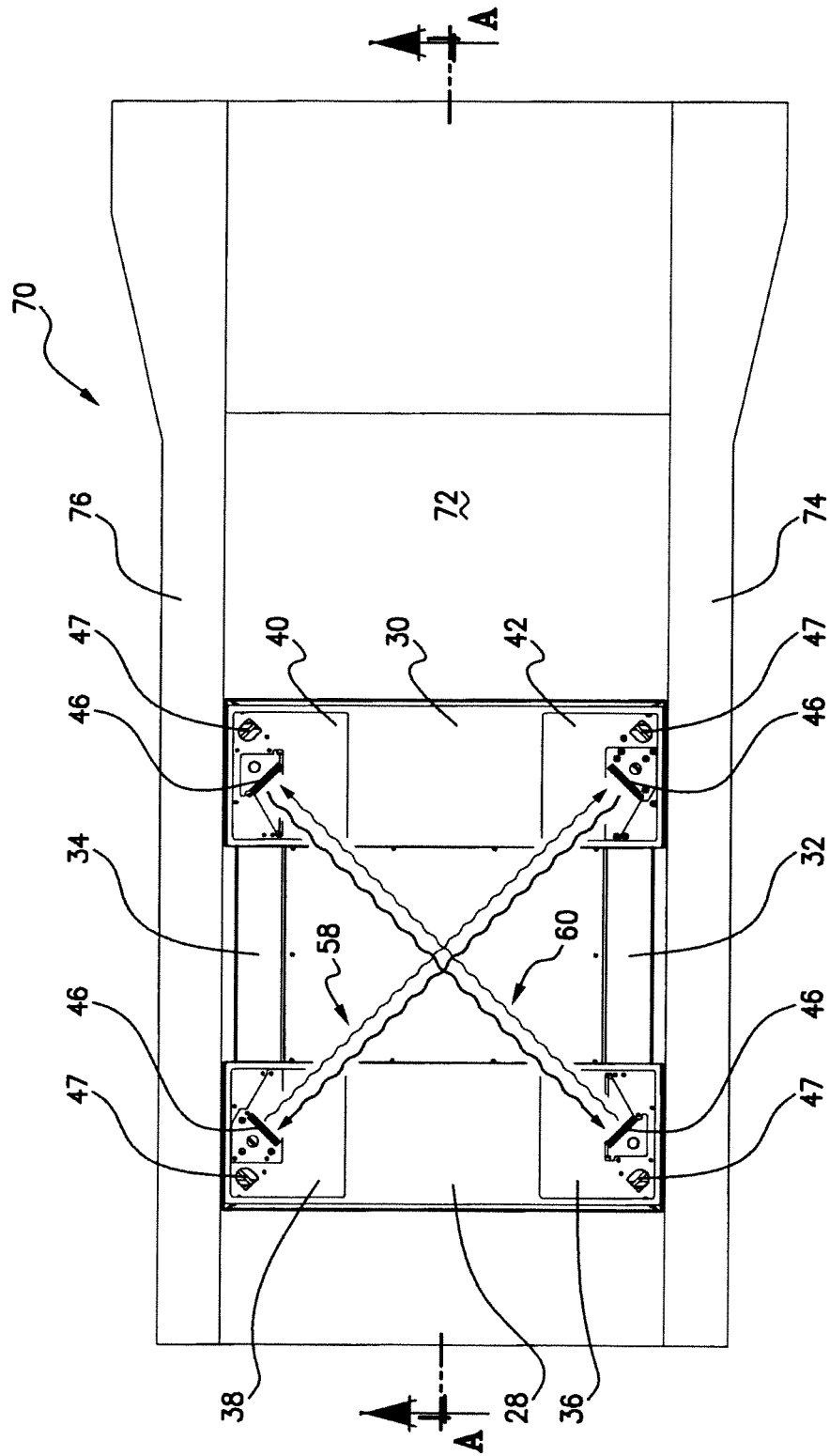
FIG. 8 is a plan view of FIG. 7.
Figure 9:
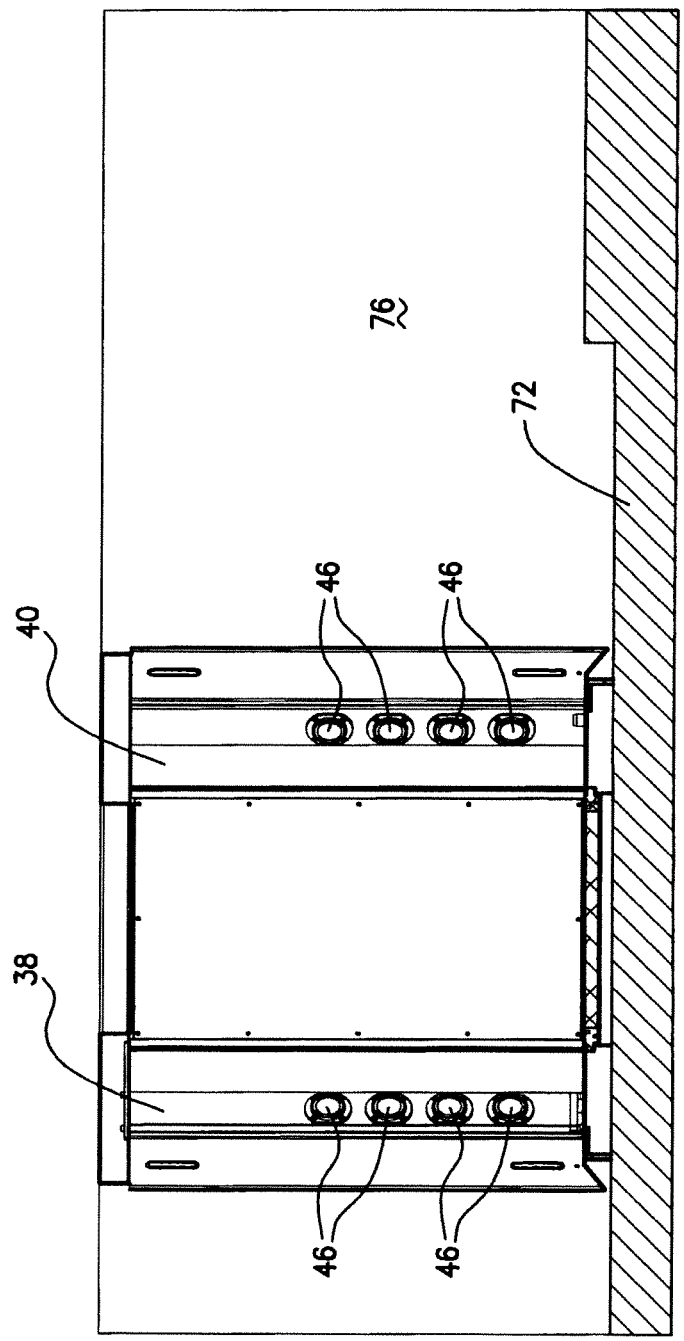
FIG. 9 is a cross-sectional along in the direction of arrows A-A shown in FIG. 8.
Figure 12:
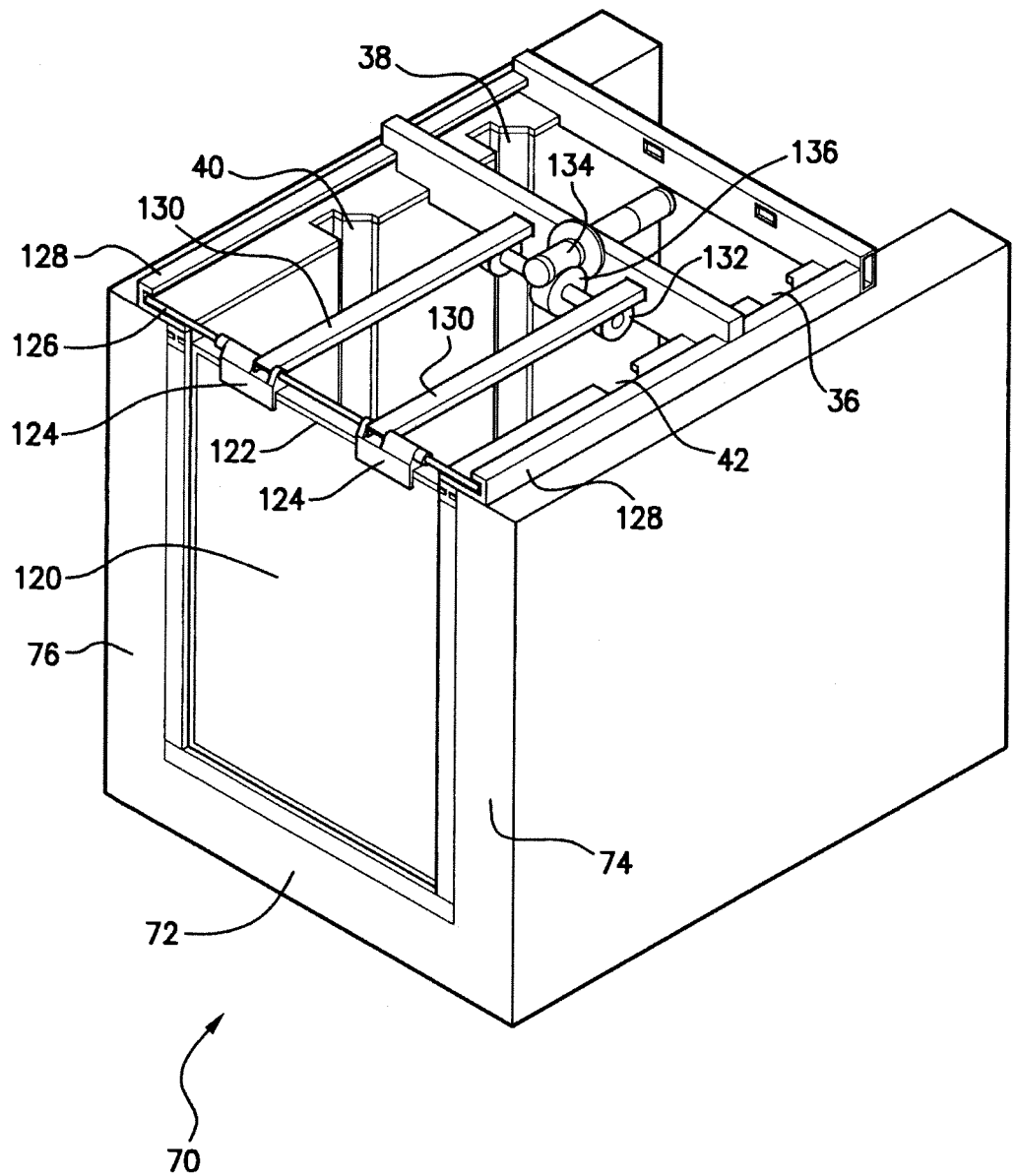
FIG. 12 is a perspective view of an embodiment of the construction of the rotatable undershot gate leaf assembly depicted in FIG. 8 in the closed position.
Figure 13:
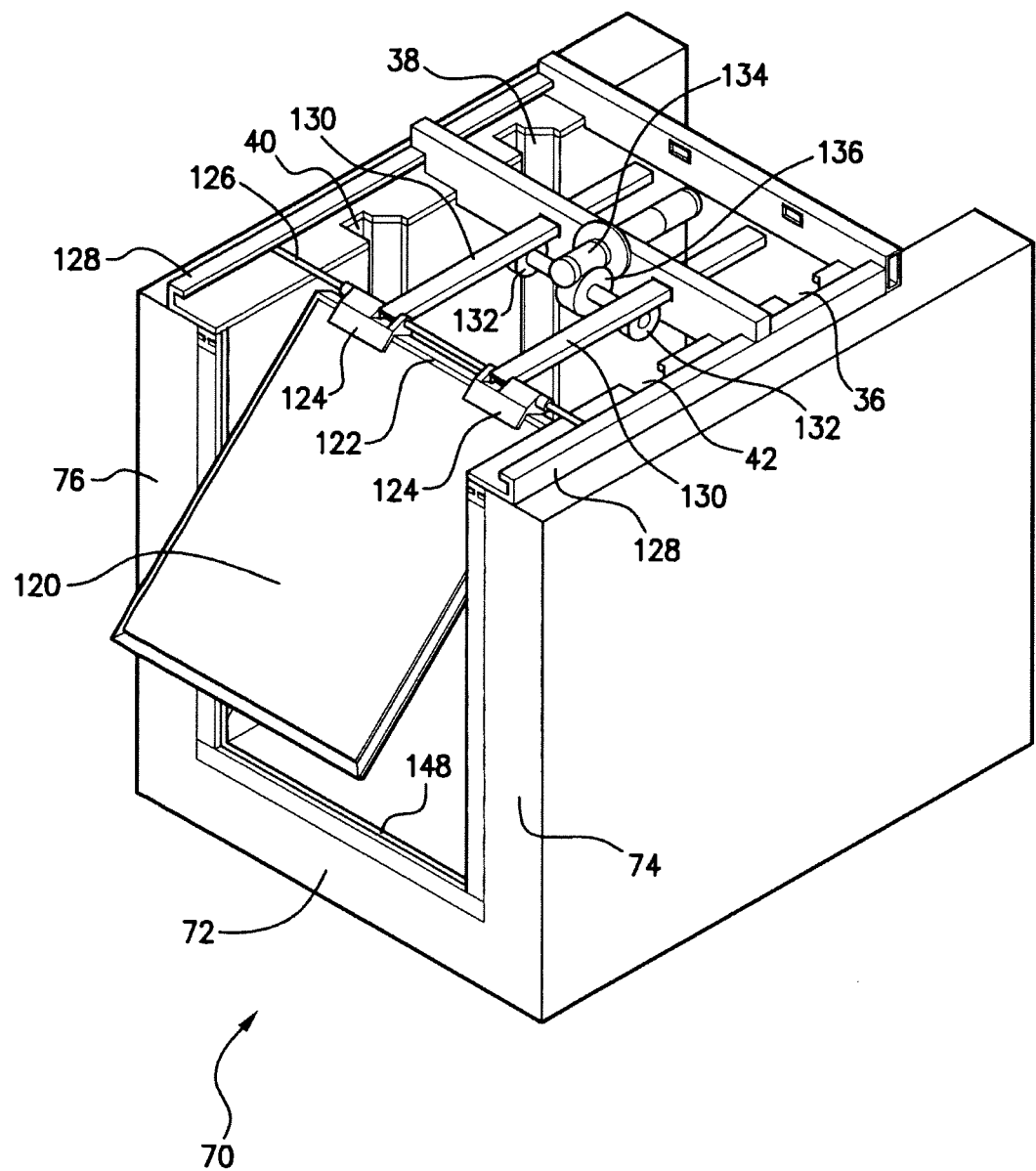
FIG. 13 is a similar view to that of FIG. 12 with the gate leaf being raised.
Figure 14:
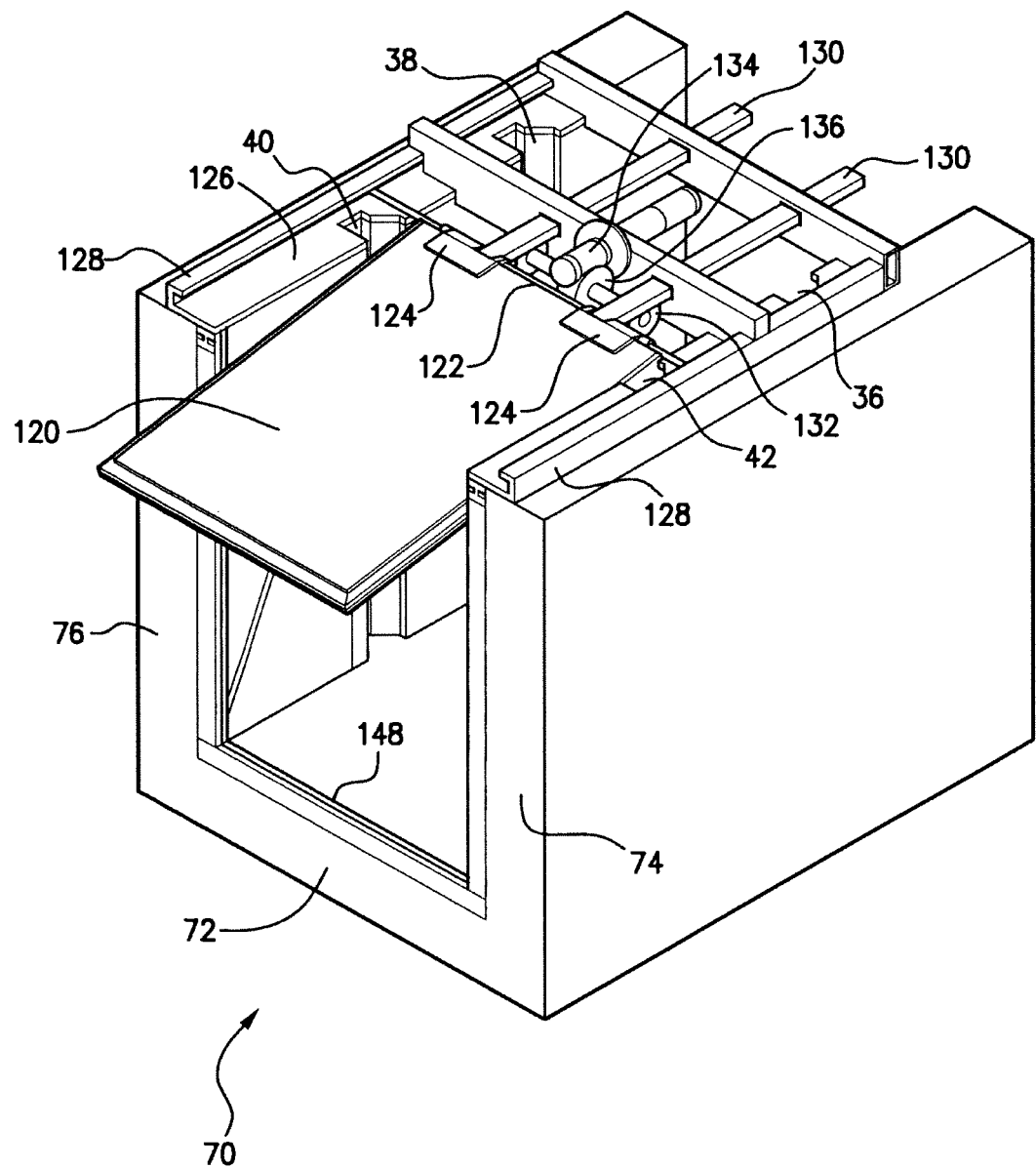
FIG. 14 is a similar view to that of FIG. 13 with the gate leaf in the fully raised position.
Figure 15:
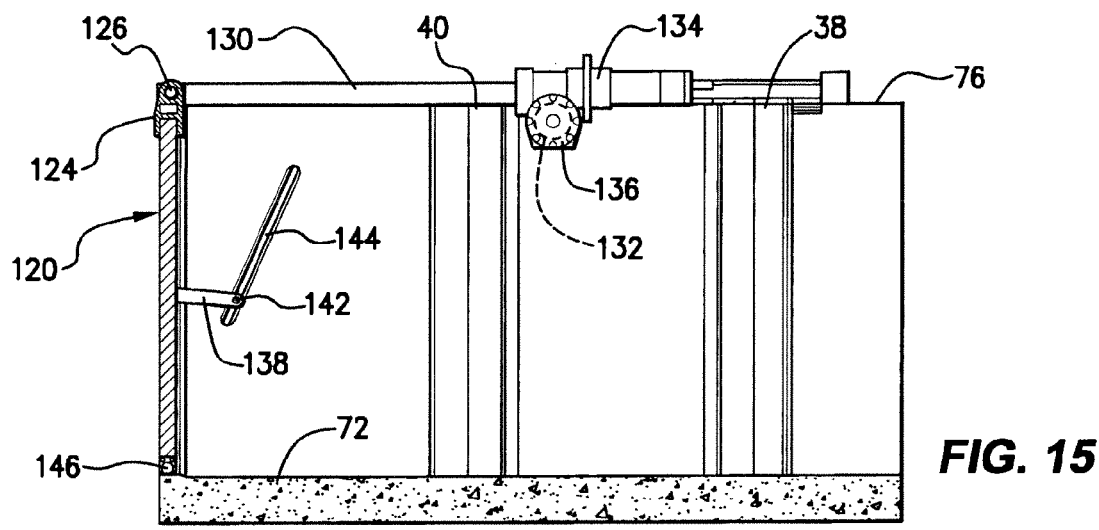
FIG. 15 is a longitudinal cross-sectional view of FIG. 12.
Figure 16:
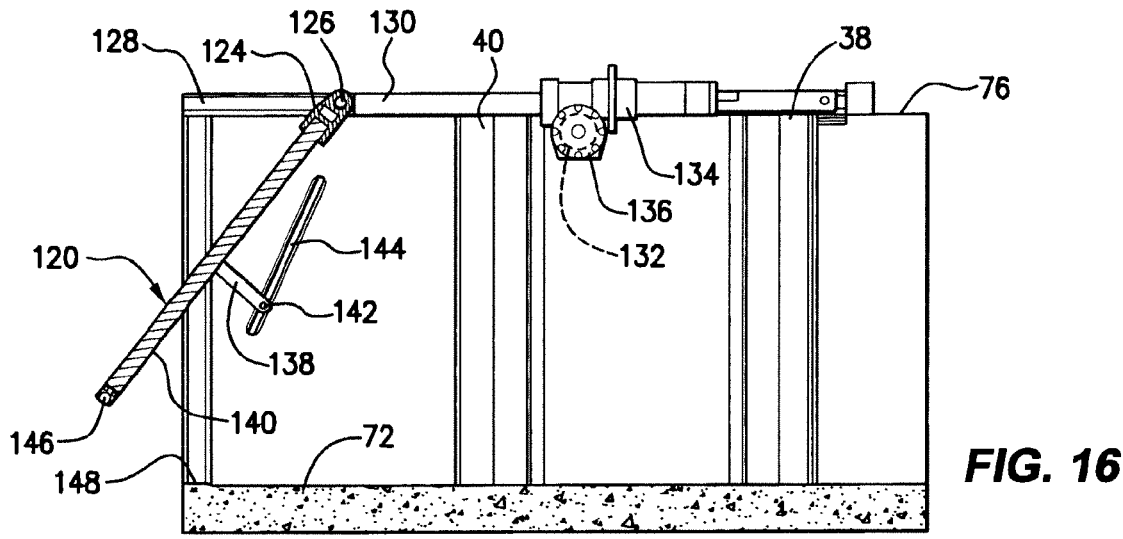
FIG. 16 is a longitudinal cross-sectional view of FIG. 13.
Figure 17:
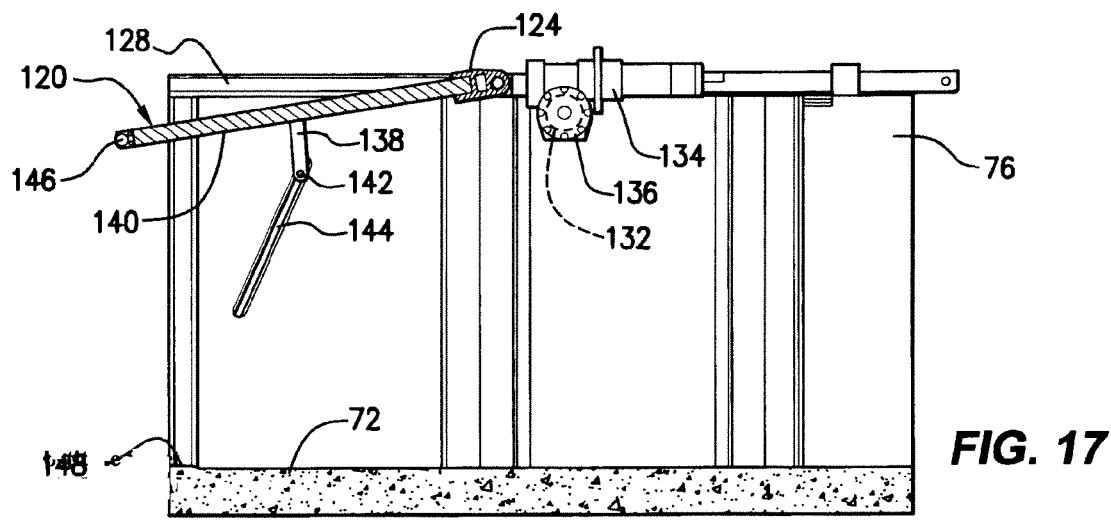
FIG. 17 is a longitudinal cross-sectional view of FIG. 14.

FIGS. 7 to 9 show the use of the acoustic flow meter assembly 20 in an open channel environment, typically used for water irrigation. A U-shaped channel 70 having a base 72 and sidewalls 74, 76 is used to control flow of irrigation water. The acoustic flow meter assembly 20 shown in FIG. 1 can be used but does not require the access ports 52 as the installation is not buried in the ground. Pipe section 26 is not required. This embodiment is similar in construction to the previous embodiment in that four retrievable cartridges 44 are provided. However the system can also be designed with one, two, three, or more retrievable cartridges 44, similar to the previous embodiment. The acoustic flow meter assembly 20 is manufactured under high tolerance and completely defines the geometry that the metered fluid passes through. This assembly 20 ensures that the fluid always passes through the same geometry through the body of the acoustic flow meter assembly 20 regardless of the geometry of the channel 70 into which it is installed. The cartridges 44 can be slidably removed and replaced without changing the geometry of the acoustic flow meter assembly 20. The cartridges 44 are each individually calibrated with a calibration referenced to their mounting points within the four hollow legs 36, 38, 40 and 42. This allows the cartridges 44 to be interchanged without effecting the calibration of the acoustic flow meter assembly 20. The acoustic transducer behaviour and geometry requirements are the same as described for the previous embodiment.

In FIG. 10 the acoustic flow meter assembly 20 of FIGS. 7 to 9 includes a downstream control gate 80. In this embodiment the control gate 80 is a simple guillotine gate which is raised and lowered vertically and closes on a seal 82. The control gate 80 can be separate from the acoustic flow meter assembly 20, as shown, or could be integrated into a combined assembly. The control gate 80 forms an undershot gate which influences the surface velocity of the fluid 84 flowing through the acoustic flow meter assembly 20 and reduces the influence of the surrounding world on the flow profile passing through the acoustic flow meter assembly 20. As previously described the velocity is measured at a number of vertical elevations by acoustic transducers 46, and the velocity at each of these elevations is then fitted to a relationship which is used to interpolate the velocity at heights between the sampled elevations.

The surface velocity of the fluid 84 is typically not measured because the elevation of the surface thereof varies during operation and so it is generally not possible to locate an acoustic transducer plane at the surface 86 of the fluid. The floor velocity is always zero, and the velocity at all elevations below the top transducer plane 62 can be interpolated from the measured values obtained in the planes above and below the elevation of interest. The unknown surface velocity means that the velocity at elevations above the top transducer plane 62 must be extrapolated based on assumptions of the shape of the velocity profile. This top section of the flow is typically where the greatest uncertainties in the velocity profile occur, as there is no information about the velocity at the surface. In worst case scenarios this velocity could be extremely high or even in a reverse direction to the flow due to surface influences such as wind. By locating control gate 80 downstream of acoustic flow meter assembly 20 and ensuring that the lower tip 88 of control gate 80 is always submerged, the control gate 80 maintains a laminar and streamlined flow profile which is free of turbulence. The velocity of the fluid will be zero in front of control gate 80. This flow profile is repeatable and may be characterised by a flow model which computes the flow rate using measurements of gate position and the fluid velocities measured by the acoustic transducer system. The repeatability of the flow profile passing under the control gate 80 is combined with the measured flow velocities at each of the sensor plane elevations 62, 64, 66 and 68 and is used to reduce the uncertainty in the estimation of the fluid's surface velocity through the body of the acoustic flow meter assembly 20.

The influence of the undershot control gate 80 reduces the potential variation in the flow pattern through the acoustic flow meter assembly 20.

In FIG. 11 the guillotine control gate 80 of FIG. 10 is replaced with a tilt-lift type gate 90. The control gate 90 can be separate from the acoustic flow meter assembly 20, as shown, or could be integrated into a combined assembly. Gate 90 allows the gate to be in vertical disposition when closed on seal 82 and an angular or horizontal disposition when in the open position. Gate 90 is held between a frame 92 which includes a horizontal track 94 and a vertical track 96. Pins or rollers 98, 100 are located on the corners of gate 90 and are held captive in tracks 94, 96. The pins or rollers 98, 100 will move along their respective tracks to allow opening and closing of gate 90. Movement of gate 90 is controlled by a motor driven or hydraulic arm (not shown) coupled to the top 102 of gate 90. By pulling or pushing the top 102 of gate 90 the gate will be raised or lowered to act as an undershot gate.

The tilt lift gate 90 allows for both a repeatable flow streamline for a given gate position as well as keeping the velocity of the fluid at the surface to a minimum. Both the above ensure minimal error in computing the flow for the segment between the sensors 48 in the top sensor plane elevation 62 and the water surface 84. The undershot gate 90 being located downstream creates a surface velocity distribution through the body of the acoustic flow meter assembly 20 meter that is more repeatable and predictable than would be the case if the undershot gate 90 were not present. The gate 90 forces the flow to be non-turbulent and laminar. The gate 90 allows creation of a flow computation algorithm which is a function of the gate position and the velocities measured by the acoustic transducers 46.

The open channel and closed conduit implementations of the acoustic flow meter assembly 20 are supplied as a single assembly which completely defines its own geometry such that in-field commissioning of meter geometry parameters is not required.

FIGS. 12 to 17 show a further variation of the tilt-lift gate 90 shown in FIG. 11. In this embodiment gate 120 does not have the pins or rollers 98, 100 at both ends of gate 90 in FIG. 11. The control gate 120 can be separate from the acoustic flow meter assembly 20 or could be integrated into a combined assembly, as shown. The integration of the control gate 120 and the acoustic flow meter assembly 20 will allow a drop in solution which has already been calibrated. Top 122 of gate 120 is pivotally mounted by brackets 124 and axle 126. The axle 126 runs in guiding tracks 128. Horizontally mounted arm members 130 are pivotally mounted to axle 126 and will allow gate 120 to be moved from a closed to an open position and vice versa. The arm members 130 can be moved by an electric motor or hydraulic means depending on requirements. In this embodiment the arm members 130 are cable driven by spools 132 which are coupled to an electric motor 134. A gear box 136 will drive the spools 132. The cables from spools 132 will be attached to the arm members 130 or axle 126.

The positioning of the gate 120 is controlled by an extension arm 138 attached to the underside 140 of gate 120. Extension arm 138 has a pivot point 142 at its free end. The pivot point 142 is at a position that will result in a minimal force (actuation force) to open gate 120. This will result in a low cost actuation and drive train system 132-136. The preferred pivot point location is that of the line of the net resultant force when the gate is in the closed position, typically ⅔ the depth of water below the water surface level. This point represents the neutral axis about which the net forces above the axis equal the net forces below the axis. The force on the gate 120 is due to water pressure and which equals:

ρ*g*h, at a given depth h below the water surface

Where

ρ is the specific weight of the fluid;

g is the acceleration due to gravity

The pivot point is offset perpendicular from the underside 140 of gate 120. Pivot point 142 is constrained to move along a rail or slot 144 which is at a downward angle towards gate 120. The offset assists in providing a downward force when closing the gate from its fully open substantially horizontal position. The offset also ensures the gate side seals (not shown) do not cross the rail or slot 144 in order to avoid leakage around the side seals. The angle of the rail or slot 144 also assists with the downward force when closing gate 120 from its fully open substantially horizontal position.

In order to minimise leakage a seal 146 is provided on the free end edge and sides of the gate 120. The seal is in the form of a bulb seal which engages on a slightly raised face 148 on the base 72 and sides 74, 76 and of the U-shaped channel 70 when gate 120 is in the vertical i.e. closed position. Seal 146 will undergo minimal compression when in contact with the U-shaped channel 70.

Figure 18:
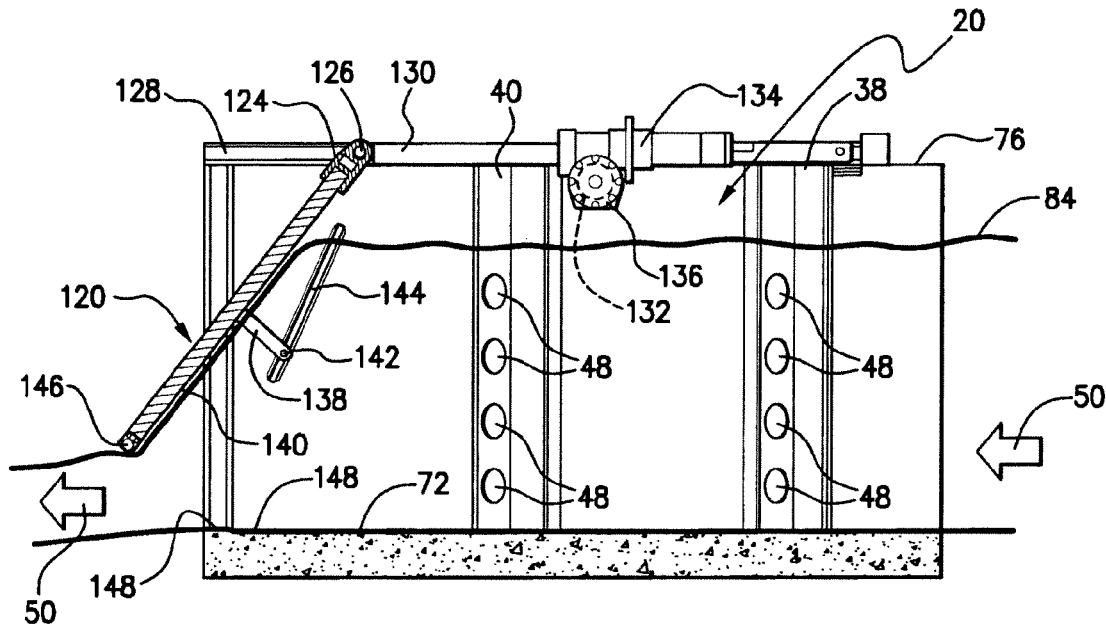
FIG. 18 is a similar view to that of FIG. 15 showing the water flow.
Figure 19:
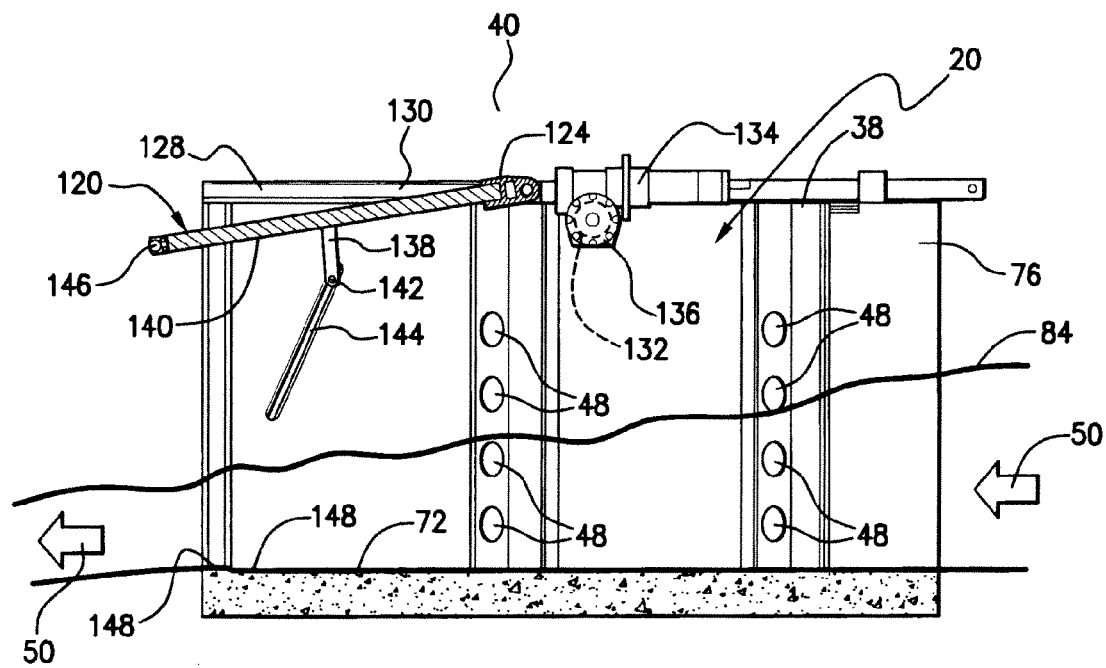
FIG. 19 is a similar view to that of FIG. 16 showing the water flow.

FIG. 18 shows the situation of the downstream gate 120 backing up the water level 84 through the body of the acoustic flow meter under the same flow and water depth conditions as FIG. 19 which has no downstream obstruction. It can be seen that the gate 120 acts to maintain a deeper flow through the body of the meter, such that all transducers are submerged below the water surface. In FIG. 19 the water surface drops as the flow velocity increases through the body of the acoustic flow meter such that several of the transducers 48 are not submerged below the water surface. This key advantage, discovered through fluid dynamic simulations causes the water to back-up in front of it in situations where there is no downstream tail water. This depth profile is problematic as many of the sensor paths will be above water and so not able to be used in the measurement. A partially open gate located downstream of the meter backs the water up so that it flows through the body of the meter at approximately constant depth such that more measurement paths can be used. This allows the flow meter to be used in hydraulic conditions which would otherwise not be compatible with metering using this approach.

Variations can be made to the embodiments to suit various environmental or design requirements. The angular position of sensor pairs 48 is not restricted to horizontal planes and preferred 45 degrees to the centreline. The sensor pairs 48 can be at angular orientation. The sensor 48 is not limited to a send and receive device with a matching pair. Many sensors could receive signals from the one transmit sensor.

In FIGS. 1 to 6 the invention could be incorporated in-situ into an existing pipeline. Sound transmission tubes 48 could be tapped and welded onto an existing pipeline rather than providing a separate acoustic flow meter assembly 20 which is inserted into the pipeline. The assembly would include the cartridges 44 in a modified frame 24.

In FIGS. 1 to 19 the acoustic transducers 46 have been described together with their operation. The acoustic transducers 46 preferably work in opposing pairs. The acoustic flow meter assembly 20 measures the travel time of the acoustic signal in a direction upstream 58B, 60B to the direction of flow 50, and also in a direction downstream 58A, 60A to the direction of flow 50 as seen in FIGS. 5a and 5b. The flow velocity creates a difference in the sound wave travel times in the upstream and downstream direction. This travel time difference is recorded and used to determine the average velocity of the water along the line of the acoustic path.

The time difference is recorded using transducers and circuitry which together have intrinsic time delays which add to the actual travel time of the acoustic signal. These transducer 46 and circuitry time delays must be subtracted from the recorded acoustic signal travel time so that the actual travel time of the acoustic signal may be determined.

The transducer 46 and circuit time delays are typically measured in a calibration of the acoustic flow meter assembly 20, and characterized as a numerical constant which is subtracted from the measured acoustic signal travel time to calculate a best estimate of the actual acoustic signal travel time.

Two constants could be determined by calibrating the acoustic signal travel time measurements in both the upstream and downstream directions. This is not necessary however, as the acoustic signal travel time in the upstream direction is subtracted from the acoustic signal travel time in the downstream direction, a single calibrated time delay constant is sufficient to calibrate the required system measurement. Under zero flow conditions the upstream signal travel time is precisely equal to the downstream signal travel time. However, due to different circuit and transducer time delay characteristics in the circuitry used to measure the travel times in the upstream and downstream directions, the measured travel times will not be identical. The difference in the measured travel times will reflect the different time delay characteristics in the circuitry used to measure the upstream and downstream travel times, and can be determined as a single numerical value at an instant in time by calibrating the measurement system under still water zero flow conditions.

Unfortunately however, the time delays contributed by the transducers 46 and the upstream and downstream measurement circuitry are not constant, but are a function of environmental influences such as temperature and pressure, and of electronic circuit conditions such as operating voltage and temperature. Changes in these time delays result from changes in temperature, pressure, operating voltages and other environmental disturbances. These changes result in a change to the calibration of the flow metering system 20 which results in errors in measuring the precise difference in acoustic signal travel times. This results in errors in the measurement of flow velocity, which are particularly significant to the measurement of low flow velocities.

To compensate for changes in the time delays within the upstream and downstream measurement circuitry, a self-calibrating measurement system is proposed which is capable of calibrating itself against a reference standard on every flow velocity measurement, thereby preventing errors in the measurement of the acoustic signal travel times. Although the embodiment will be described with reference to its operation with irrigation systems the use of this invention is not limited to that purpose.

Referring to FIGS. 20 to 25 a measurement system 200 is represented as a timer 202 which has a start input 204 and a stop input 206, together with several signal paths through which electrical information is transmitted. The drawings show only two transducers being represented in this measurement system 200 namely transducer 46A and transducer 46B from FIGS. 5a and 5b for simplicity. All paired transducers 46 from FIGS. 1 to 20 will be connected in the same manner.

Figure 20:
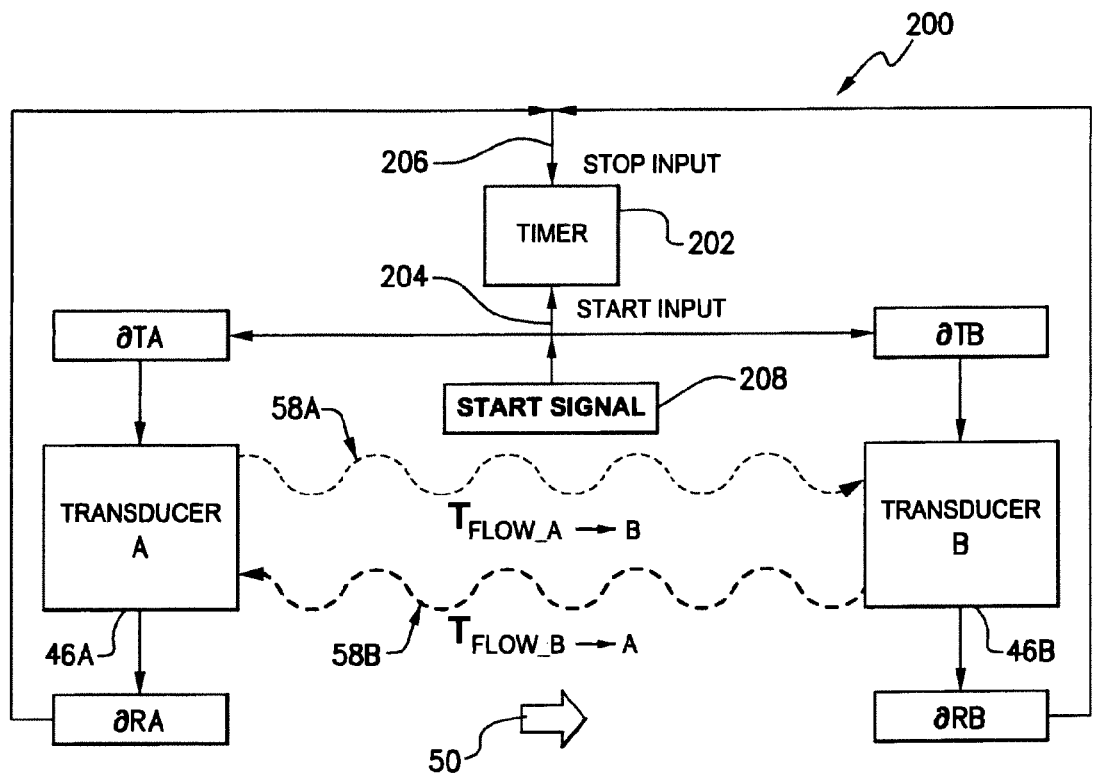
FIG. 20 is a flow schematic diagram to typically control the acoustic transducers used in the embodiment of the acoustic flow meter assembly shown in FIGS. 1 to 19 to measure the acoustic travel time between transducers.

As indicated in FIG. 20, there are electronic system time delays present in the measurement system 200. These are shown as:

$\partial RA$ is the delay between a start signal 208 being input to the timer 202 and the corresponding electrical signal being received by transducer 46A.

$\partial RB$ is the delay between the acoustic signal being received by transducer 46B and the corresponding electrical signal being input to the stop input 206 of timer 202.

$\partial TB$ is the delay between the start signal 208 being input to the timer 202 and the corresponding electrical signal being received by transducer 46B.

$\partial RA$ is the delay between the acoustic signal being received by transducer 46A and the corresponding electrical signal being input to the stop input 206 of timer 202.

The acoustic signal travel time from transducer 46A to transducer 46B along path 58A is represented as $T_{FLOW\_A \rightarrow B}$ and the acoustic signal travel time from transducer 46B to transducer 46A along path 58B is represented as $T_{FLOW\_B \rightarrow A}$.

Figure 21:
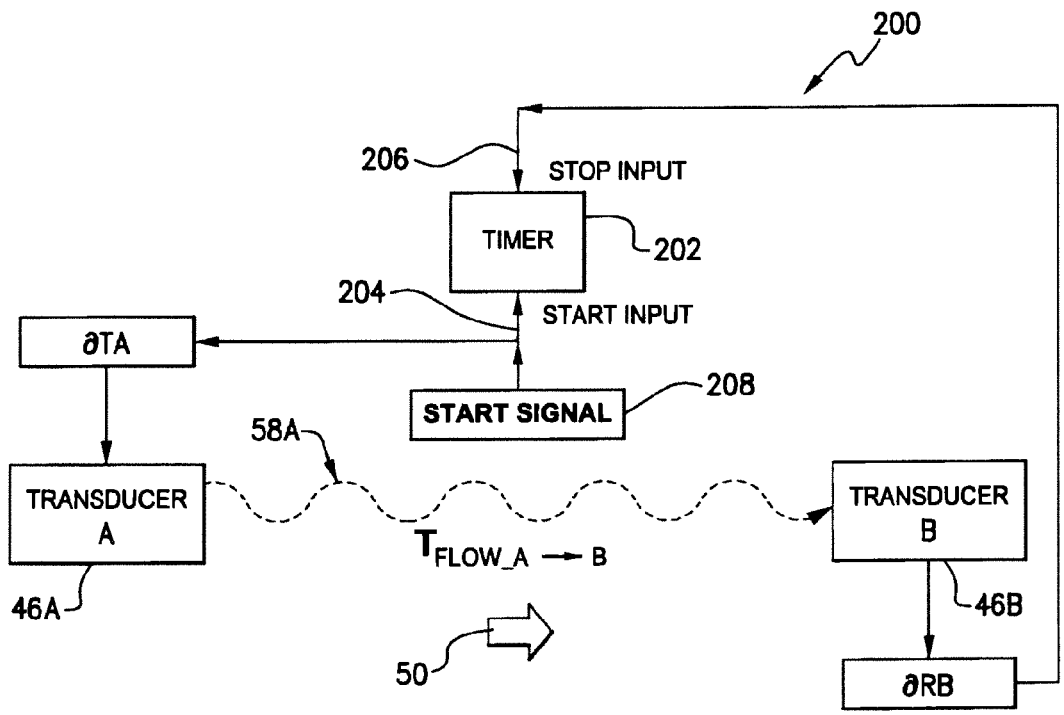
FIG. 21 is a partial view of the flow schematic diagram shown in FIG. 20 measuring flow in a first direction.

FIG. 21 shows only the signal path when measuring the acoustic signal travel time from transducer 46A to transducer 46B. This signal travel time is determined by sending a transmit signal 208 to transducer 46A. This transmit signal 208 has an initial signal characteristic which defines the start of the transmit signal. This signal characteristic is input to the timer 202 and defines the start of the time measurement. The transmit signal 208 is transmitted to transducer 46A which responds by transmitting an acoustic signal to transducer 46B. Transducer 46B converts this acoustic signal to an electrical signal which is input into the timer 202 and defines the end of the time measurement. The time measured when transmitting the acoustic signal from transducer 46A to transducer 46B is $$T_{AB} = \lfloor(\delta TA + T_{FLOW\_A \rightarrow B} + \delta RB)\rfloor$$

Figure 22:
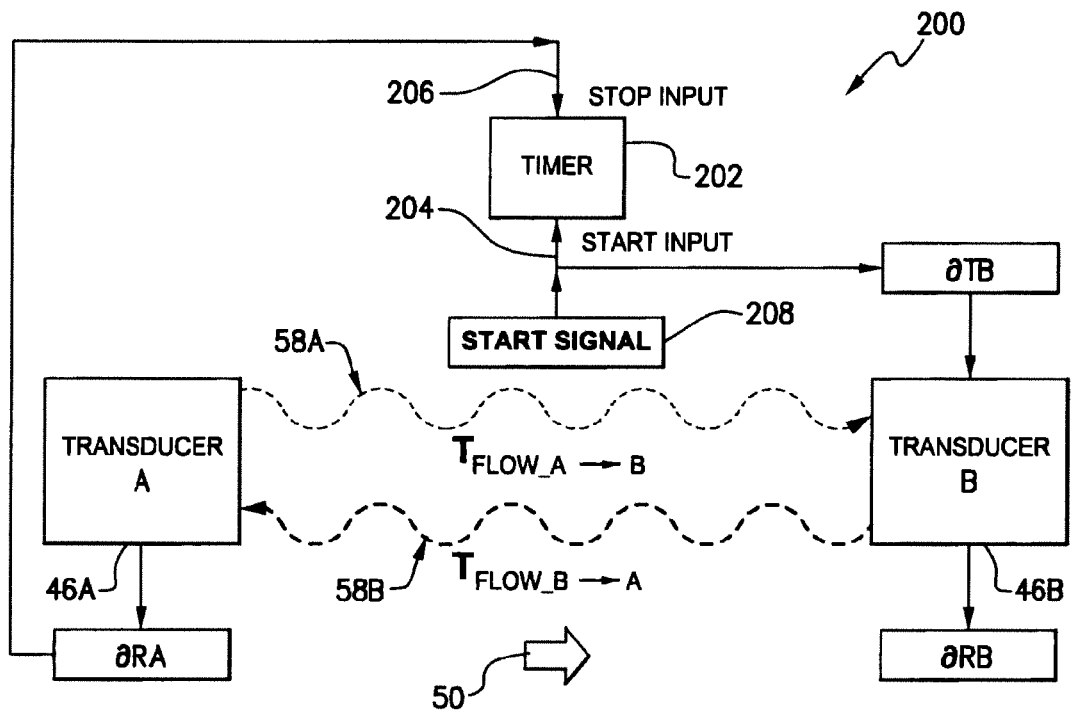
FIG. 22 is a partial view of the flow schematic diagram shown in FIG. 20 measuring flow in a second direction opposite to that shown in FIG. 21.

This procedure is then repeated in the opposite signal direction as illustrated in FIG. 22. The acoustic signal travel time from transducer 46B to transducer 46A is determined by sending a transmit signal 208 to transducer 46B. This transmit signal 208 has an initial signal characteristic which defines the start of the transmit signal. This signal characteristic is input to the timer 202 and defines the start of the time measurement. The transmit signal 208 is transmitted to transducer 46B which responds by transmitting an acoustic signal to transducer 46A. Transducer 46A converts this acoustic signal to an electrical signal which is input into the timer 202 and defines the end of the time measurement. The time measured when transmitting an acoustic signal from transducer 46B to transducer 46A is $$T_{BA} = \lfloor (\delta TB + T_{FLOW\_B \to A} + \delta RA) \rfloor$$

The difference in the sound wave travel times in the upstream and downstream direction is then measured as $$\Delta T = T_{AB} - T_{BA}$$
$$= \lfloor (\delta TA + T_{FLOW\_A \to B} + \delta RB) \rfloor - \lfloor (\delta TB + T_{FLOW\_B \to A} + \delta RA) \rfloor$$
$$= (T_{FLOW\_A \to B} - T_{FLOW\_B \to A}) + ((\delta TA + \delta RB) - (\delta TB + \delta RA))$$
$$= (T_{FLOW\_A \to B} - T_{FLOW\_B \to A}) + X$$

Where X is a calibration constant.

Figure 23:
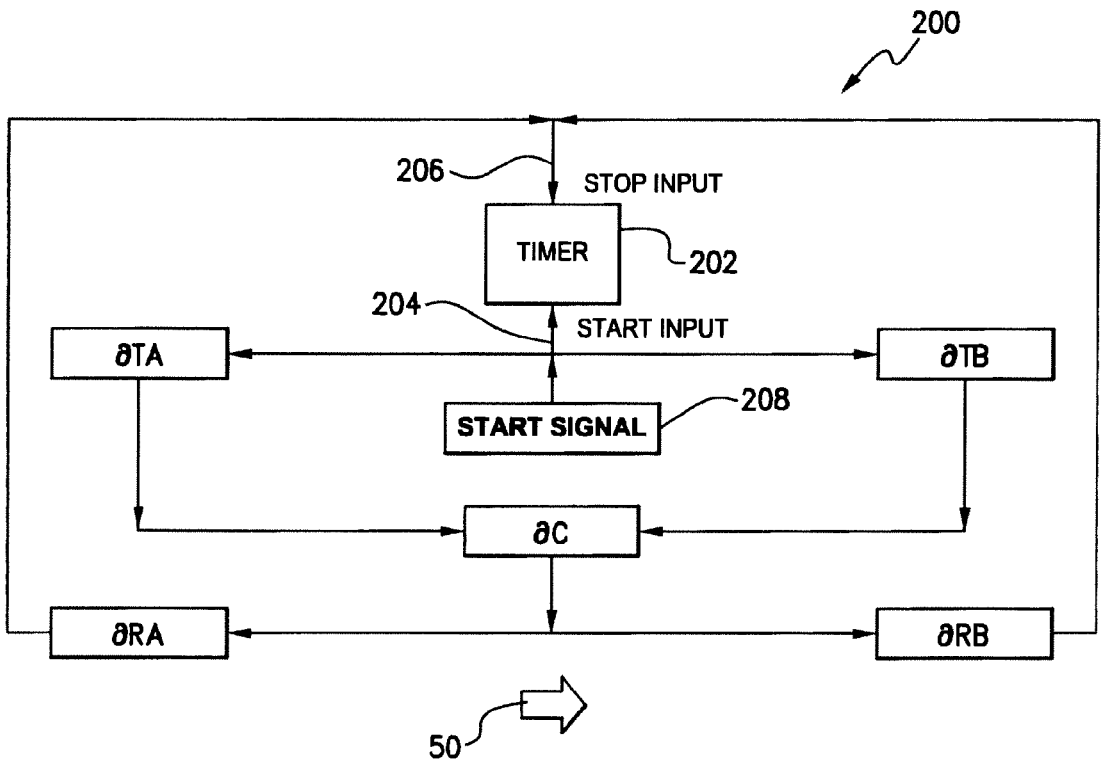
FIG. 23 is a flow schematic diagram of a calibration circuit used in conjunction with the flow schematic diagram shown in FIG. 20 to eliminate circuit delays from the diagram of FIG. 20.

In order to calculate the calibration constant the invention provides additional measurements without using the transducers 46A, 46B. This aspect is shown in FIG. 23. The invention switches in an alternative signal path which bypasses the ultrasonic transducers 46A, 46B to allow the circuitry time delays to be measured. If the transducers 46A, 46B are switched out of the circuit and a delay path ∂C is switched in, then when transducer 46A is configured as the transmitting transducer then the following equation is applicable:

$$T_{AB\_Calibration} = [(\delta TA + \delta C + \delta RB)]$$

Figure 24:
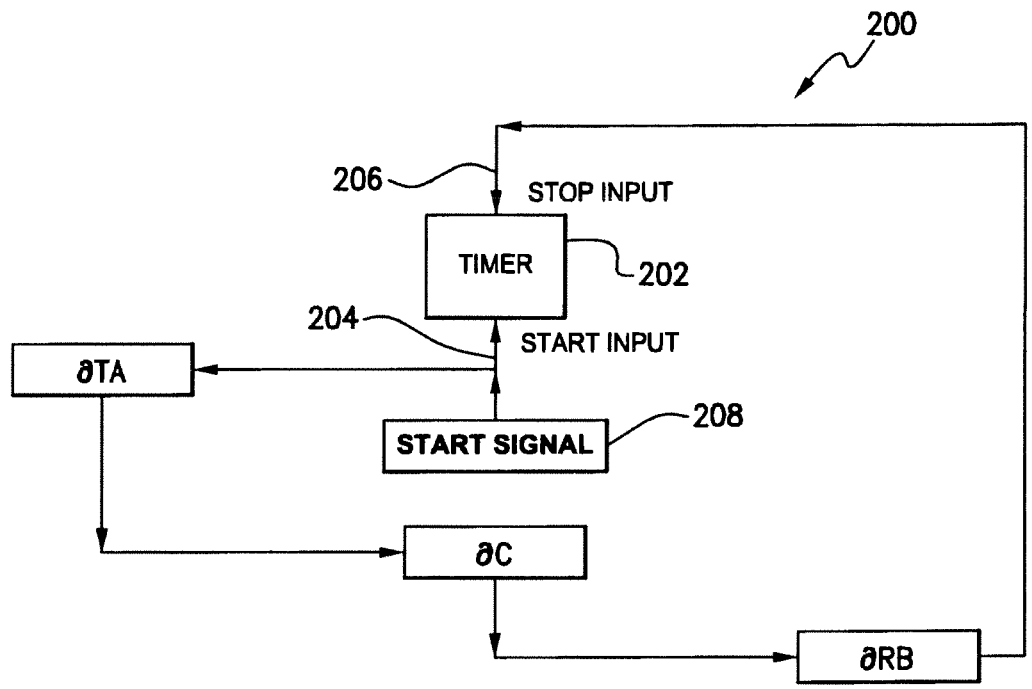
FIG. 24 is a partial view of the flow schematic diagram shown in FIG. 23 to calibrate delays for measuring flow in the first direction shown in FIG. 21.

This system configuration is shown in FIG. 24.

Similarly, if transducers 46a, 46B are switched out of the circuit and the delay path ∂C is switched in then when transducer 46B is configured as the transmitting transducer then the following equation is also applicable:

$$T_{BA\_Calibration} = [(\delta TB + \delta C + \delta RA)]$$

Figure 25:
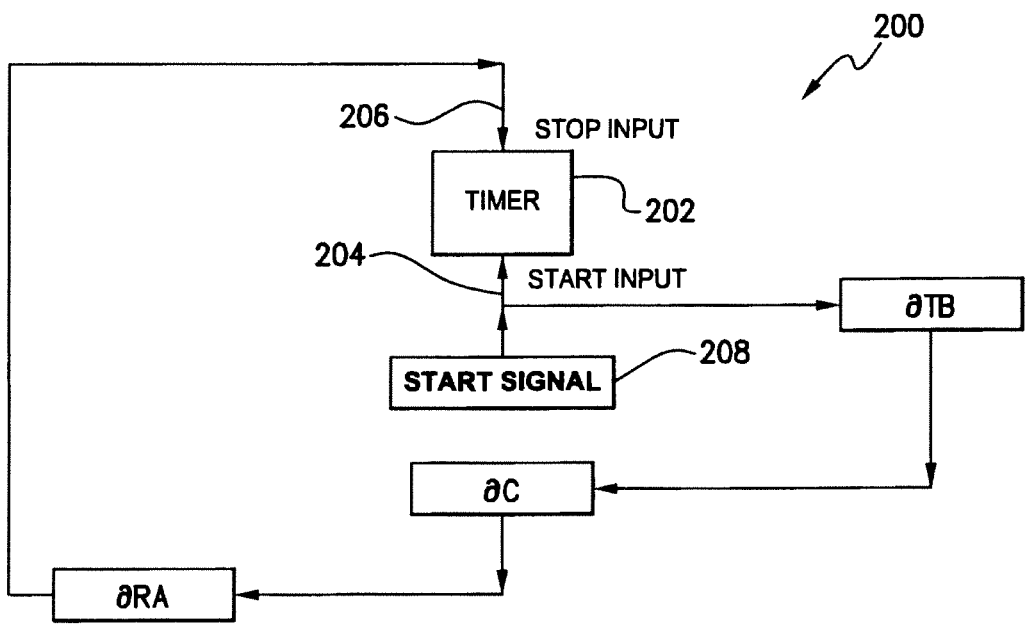
FIG. 25 is a partial view of the flow schematic diagram shown in FIG. 23 to calibrate delays for measuring flow in the second direction opposite to that shown in FIG. 21.

This system configuration is shown in FIG. 25.

These calibration measurements can then be used in conjunction with the acoustic signal travel time measurements to eliminate the circuit delays ∂TA, ∂TB, ∂RA, ∂RB from the estimation of the acoustic signal travel times such that these travel times can be determined precisely.

The measurement process will be as follows:
1. The measurement system 200 is first configured as per FIG. 21 to measure $T_{FLOW\_A \to B}$.
2. The measurement system 200 is then configured as per FIG. 22 to measure $T_{FLOW\_B \to A}$.
3. The measurement system 200 is then configured as per FIG. 24 to measure $T_{BA\_Calibration}$
4. The measurement system 200 is then configured as per FIG. 25 to measure $T_{AB\_Calibration}$ The four system measurements are then combined to determine the result $(T_{FLOW\_A \to B} - T_{FLOW\_B \to A})$.

If the calibration times are subtracted from the flow measurement times, then the results are $$T_{AB} - T_{AB_{Calibration}} = [(\delta TA + T_{FLOW\_A \to B} + \delta RB) - (\delta TA + \delta C + \delta RB)] = [T_{FLOW\_A \to B} - \delta C]$$

$$T_{BA} - T_{BA_{Calibration}} = [(\delta TB + T_{FLOW\_B \to A} + \delta RA) - (\delta TB + \delta C + \delta RA)] = [T_{FLOW\_B \to A} - \delta C]$$

The difference in transmit time can then be determined as $$(T_{AB} - T_{AB\_Calibration}) - (T_{BA} - T_{BA\_Calibration}) = [T_{FLOW\_A \to B} - \delta C] -$$
$$[T_{FLOW\_B \to A} - \delta C]$$
$$= [T_{FLOW\_A \to B} - T_{FLOW\_B \to A}]$$

It can be seen in the above formula that the electronic circuit delay times have been removed from the acoustic signal transit time measurements, and the difference in signal transit time measurements is determined precisely. With high speed computer technology the calibrations can occur in real time or the calibrations may be monitored at predetermined intervals.

The invention in another aspect provides a further method of measurement of velocity of fluid flowing in a pipe. In the conventional application of acoustic transit time technology to measure the rate of flow in pipes it is common to use either a single path or cross path technique. These applications rely on the pipe being full or pressurized. The single path technique assumes a symmetrical velocity distribution around the centre line of the pipe with oppositely facing and offset top and bottom acoustic transducers. The cross path technique is used where the velocity distribution is non-symmetrical around the pipe centre line. In this cross path technique two pairs of oppositely facing and offset top and bottom acoustic transducers are used and their acoustic paths cross the pipe centre line. Many flow meter applications not only require the ability to detect the real time failure of a flow meter but also the ability to record flow measurement without any loss of continuity of data. This is especially a requirement of meters that are used for revenue billing applications with strong quality compliance requirements. It also applies to meters that are remotely located and can take some time to service. Accordingly, the failure of an acoustic transducer in the non-symmetrical velocity distribution will result in inaccurate readings as the resulting single path technique will only provide accurate readings in a symmetrical velocity distribution.

In FIGS. 26 and 27 there is shown a pipe 250 with a fluid flowing therethrough in direction 251. Six pairs of acoustic transducers 252,254; 256,258; 260,262; and 264,266 with two pairs of acoustic transducers hidden by their alignment with transducers 260-266 are equi-spaced around pipe 250. The positioning of the acoustic transducers is not restricted to being equi-spaced but can be placed in positions to suit requirements. The number of pairs of acoustic transducers can vary but at least three pairs must be provided. The upstream and downstream acoustic paths 270-276 and hidden paths all cross at a central point 278 along the central axis 280 of pipe 250. Accordingly, measurements along the six paths 270-276 and hidden paths can be made to increase accuracy. If one of the acoustic transducers 252-266 or the hidden transducers fails, then measurements can still be made with the remaining acoustic transducers. The failure can be detected and the faulty acoustic transducer replaced at a convenient time.

This aspect of the invention provides at least three single or cross paths located around the centre line 280 of pipe 250. This approach will provide at least three independent flow meters formed by the co-operating pairs of acoustic transducers on pipe 250. The result is to allow the real-time detection of the failure of any one of the independent flow meters, but also to be able to maintain flow measurement until the fault is corrected. To achieve this effect using other metering technologies, for example, magnetic flow meters, would require three meters to be installed in series along a section of pipe.

It is evident to the man skilled in the art that the embodiment shown in FIGS. 26 and 27 can be readily incorporated into the embodiment shown in FIGS. 1 to 6.

In accordance with a further preferred aspect of the present invention, and in this regard reference is made to FIGS. 28 to 35 inclusive of the drawings, what is referred to hereinafter as a time of flight or transit time measuring apparatus is located immediately upstream of a slide or control gate 500. The control gate 500 may be of the type referred to in the present applicant's Australian Patent No. 2001283691, as referred to and described earlier in this specification.

Figure 28:
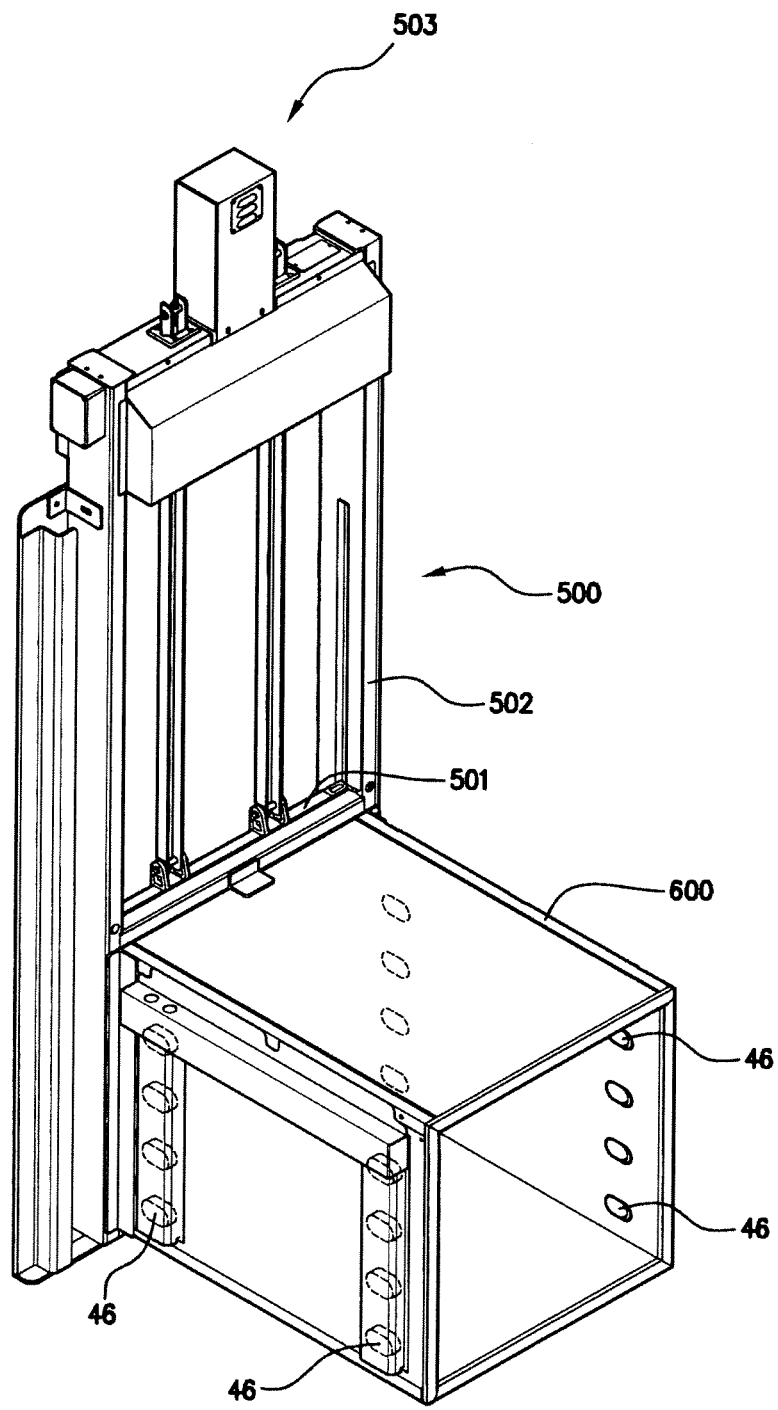
FIG. 28 is a top perspective of a flow gate including a transit time measuring apparatus in accordance with the invention.
Figure 29:
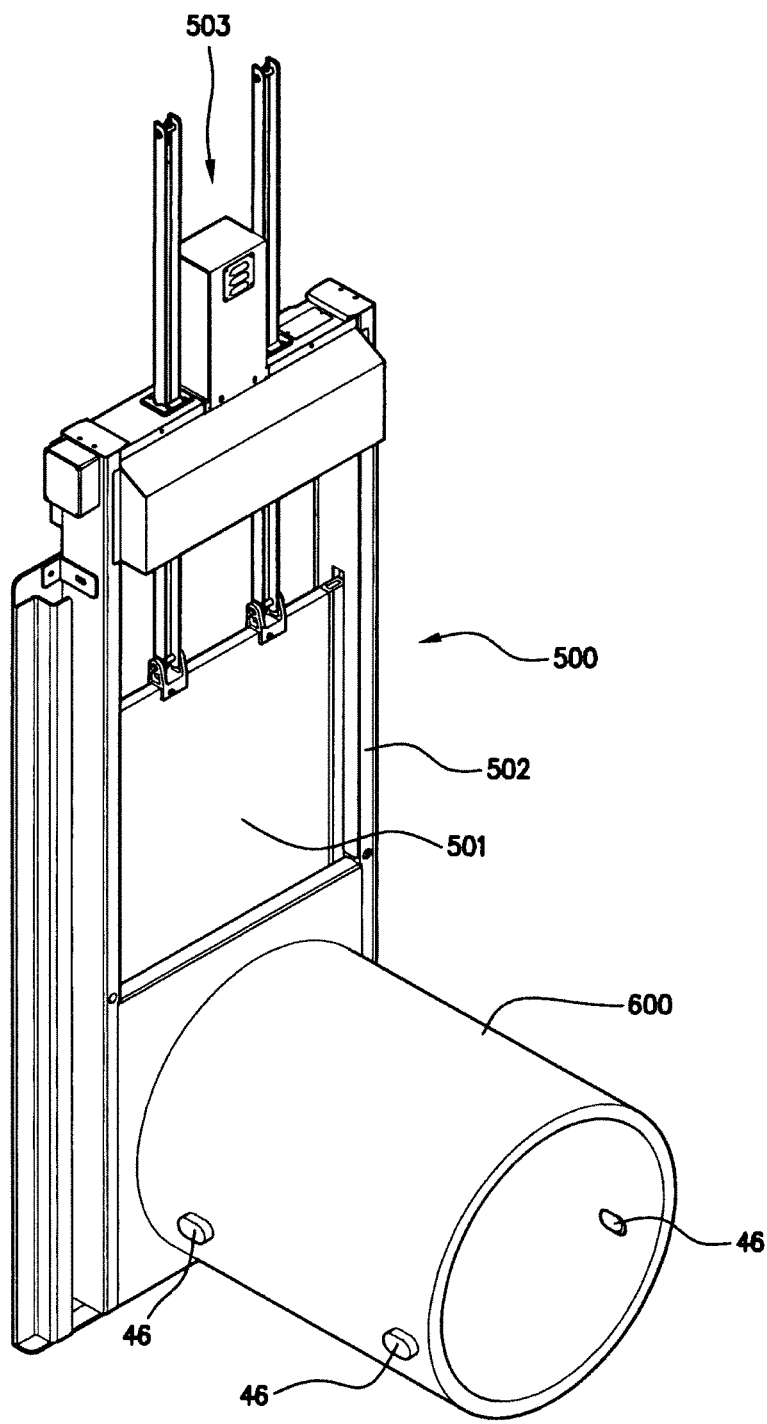
FIG. 29 is a view, similar to FIG. 28, of an alternative arrangement of flow gate and transit time measuring apparatus.
Figure 30:
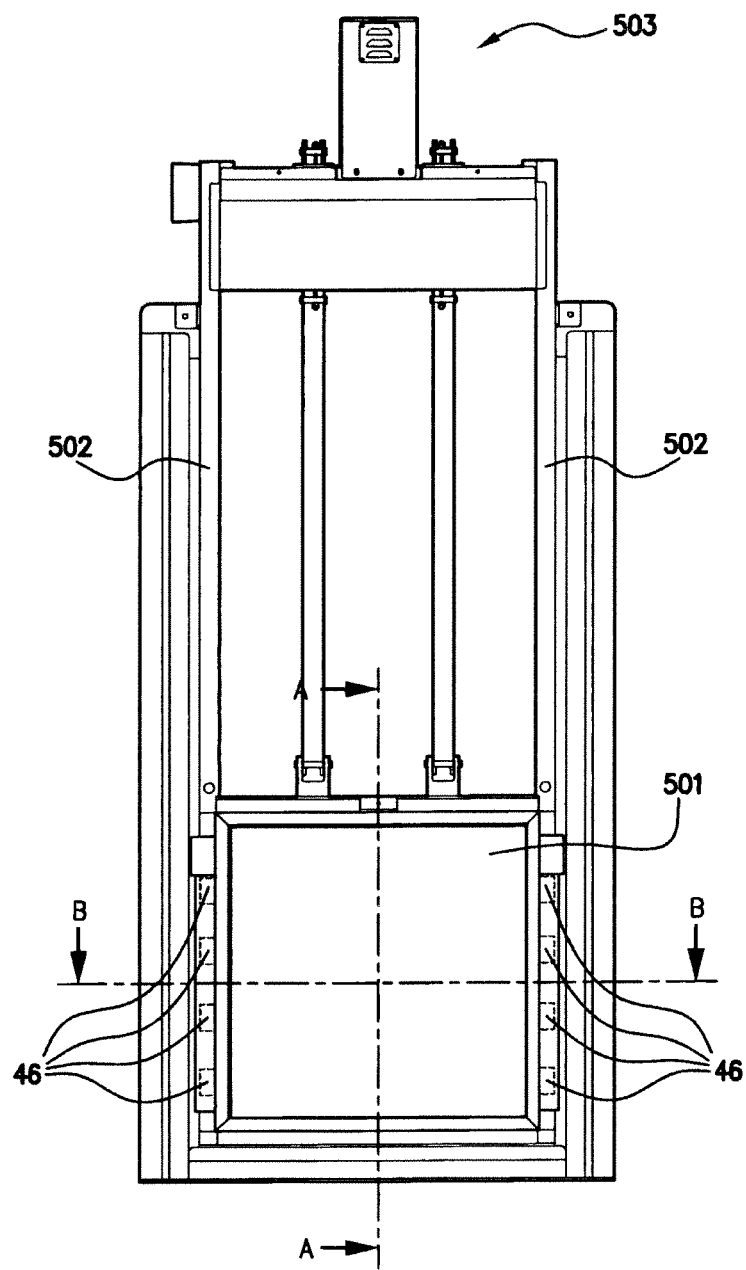
FIG. 30 is a front view of the arrangement of FIG. 28.
Figure 31:
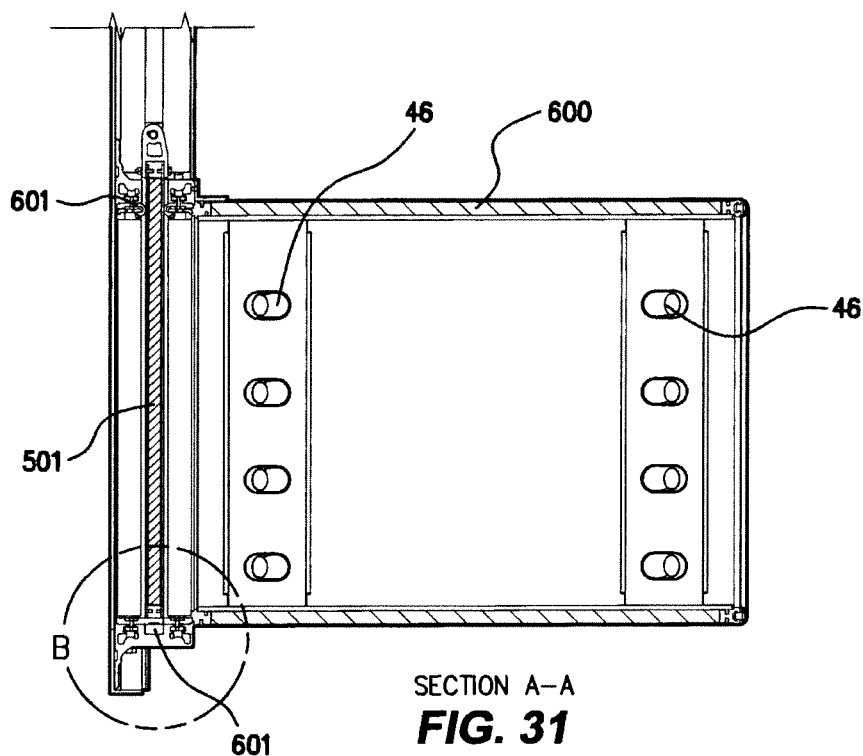
FIG. 31 is a sectional view taken along the line A-A in FIG. 30, with the gate closed.
Figure 36:
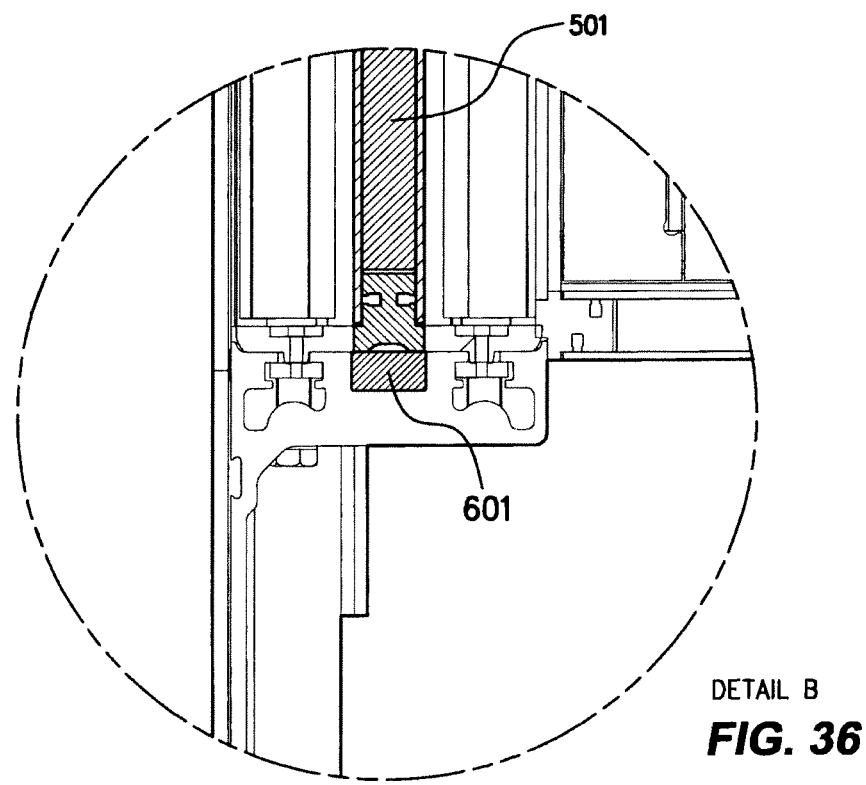
FIG. 36 is a detail view taken at B in FIG. 31.
Figure 32:
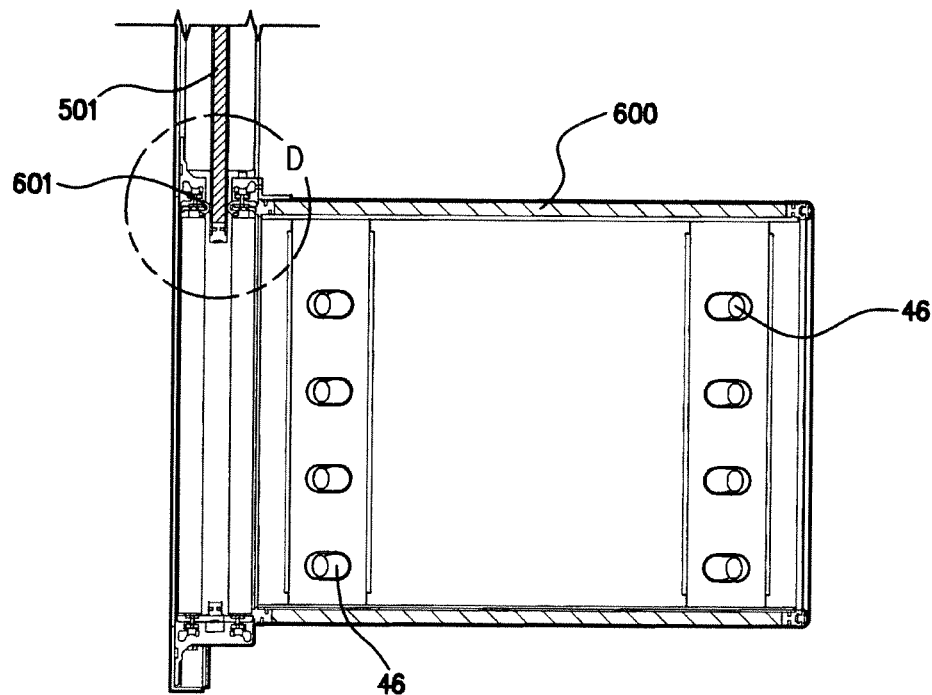
FIG. 32 is a sectional view taken along the line A-A in FIG. 30, with the gate open.
Figure 33:
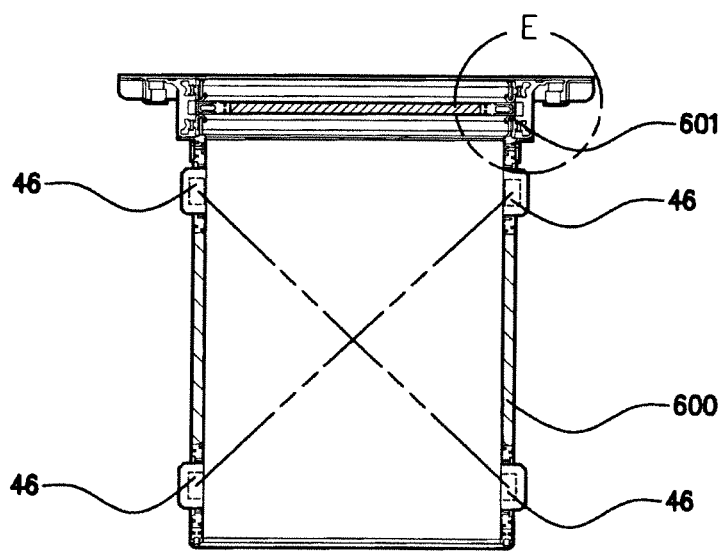
FIG. 33 is a sectional view taken along the line B-B in FIG. 30.
Figure 34:
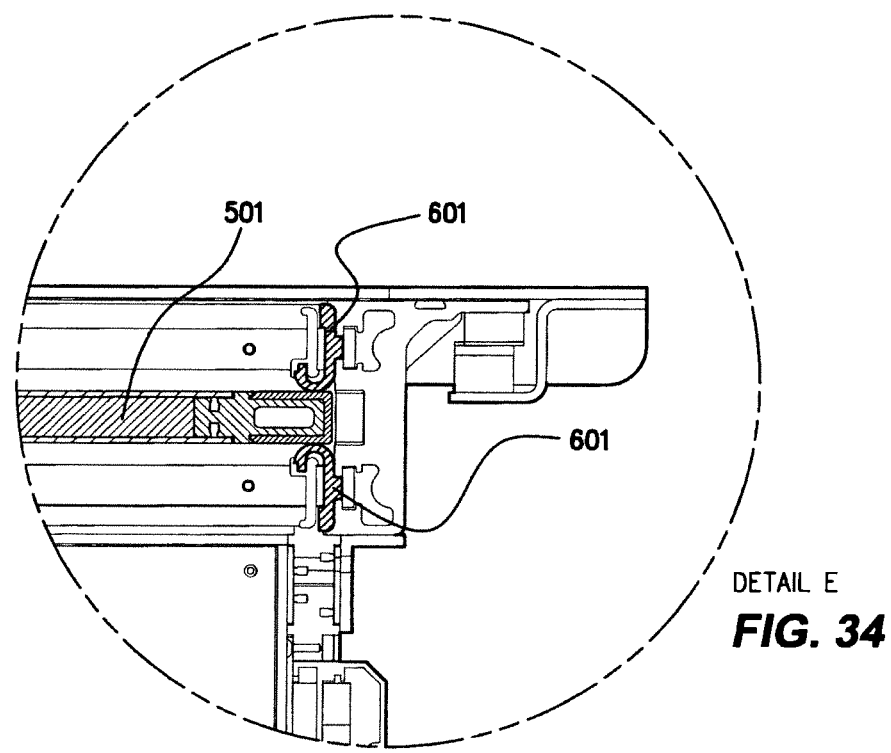
FIG. 34 is a detail view taken at E in FIG. 33.
Figure 35:
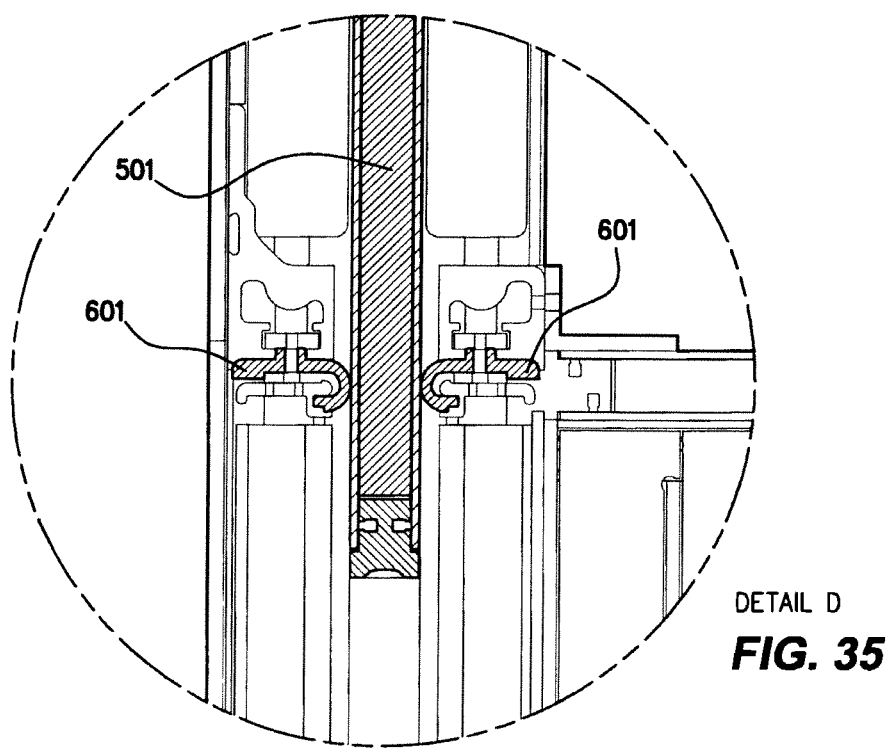
FIG. 35 is a detail view taken at D in FIG. 32.

As shown in FIGS. 28 and 29, preferably the measurement apparatus will take the form of a conduit 600, of any cross-section but more particularly of either a circular, as in FIG. 29, or a parallelepipedal as in FIG. 28, cross-section, which conduit 600 will be associated with—either fixedly or removably—the frame of a flow or control gate 500.

In FIGS. 28 to 36 there is shown a control gate 500 to be located within a conduit, as for example an irrigation channel (not shown), the function of the control gate being to allow a controlled flow of water through the channel. The control gate 500 includes a gate leaf 501 which slides within a frame 502. Frame 502 has an outer frame member, which may be permanently secured to floor and sides of an irrigation channel or conduit and an internal frame member which slides within that outer frame member. The internal frame member may be connected to and separated from the external frame member with no requirement to undertake civil works on the floor and sides of the irrigation channel. This type of internal/external frame mechanism is further detailed in the specification of the present applicant's International (PCT) Patent Application No. PCT/AU2001/001036, the contents of which are included herein by reference. Gate leaf 501 may be raised or lowered by a lifting mechanism 503 of any known type, as for example that illustrated and described in the present applicant's International Patent Application No. PCT/AU2010/000115. It should be understood, however, that the invention is not limited to usage only with such a flow or control gate.

A typical installation would involve a control or flow gate (of any given type) with the associated measuring apparatus 600 attached, in any known manner and using any known means, to the upstream inlet of a conduit or pipe, located for example in a canal, reservoir or the like watercourse. In an alternative installation there may be provided conduit connection means at both upstream and downstream ends or sides of the overall flow meter assembly as referred to earlier in this specification.

The conduit 500 has associated therewith acoustic transducers 46 for the generation of acoustic beams which traverse the flow through that conduit 500.

It should be understood that conventional or traditional transit time flow measurement apparatus have, for their operation, prescribed conditions both upstream and downstream of the measuring device in order to ensure that there is minimal disturbance to flow. These prescribed conditions are set out in detail in, for example, Australian Standard AS747.

The arrangement in accordance with the present invention relies for its operation on a derived relationship between the flow through the conduit and the transit time measurements of acoustic beams which traverse the fluid. The relationship further relies on the measurement inputs of water level (as determined by the level sensors) and gate position. In that regard reference is also made to the present applicant's International Patent Application No. PCT/AU2002/000230.

In practice the number of acoustic beams which traverse the flow can be singular or many, and can exhibit a variety of different orientations. However, preferred arrangements as shown in the drawings will include three (3) pairs of acoustic transducers 46 for the parallelepipedal conduit 600 of FIG. 28 and one (1) pair for the circular conduit 600 of FIG. 29.

The relationship between the flow and transit time, gate opening and water level may be derived using data flow experiments as explained in detail in the present applicant's International (PCT) Application No. PCT/AU2002/000230 entitled "Fluid Regulation".

The arrangement is such that the conduit 600 is substantially fixed within the channel, whilst the control gate leaf 501 is movable substantially vertically within that channel, whereby to allow for variation of flow through the conduit 600. The arrangement utilises a double seal 601, see in particular FIGS. 33 to 36, which runs the entire circumference of the gate 500. That double seal 601 ensures complete sealing of the conduit 600 from both upstream and downstream thereof, as well as external thereto. The gate 500 employs a flat face or surface on both the upstream and downstream sides of the leaf 501 to ensure position sealing through the full travel of the gate 500.

With conventional/traditional gate valve designs a bonnet is included in the overall assembly for purposes of enclosing the gate within a conduit, protecting against leakage. With the arrangement in accordance with the present invention, utilising a double seal of the type referred to earlier, there is no need for a bonnet or the equivalent.

Figure 37:
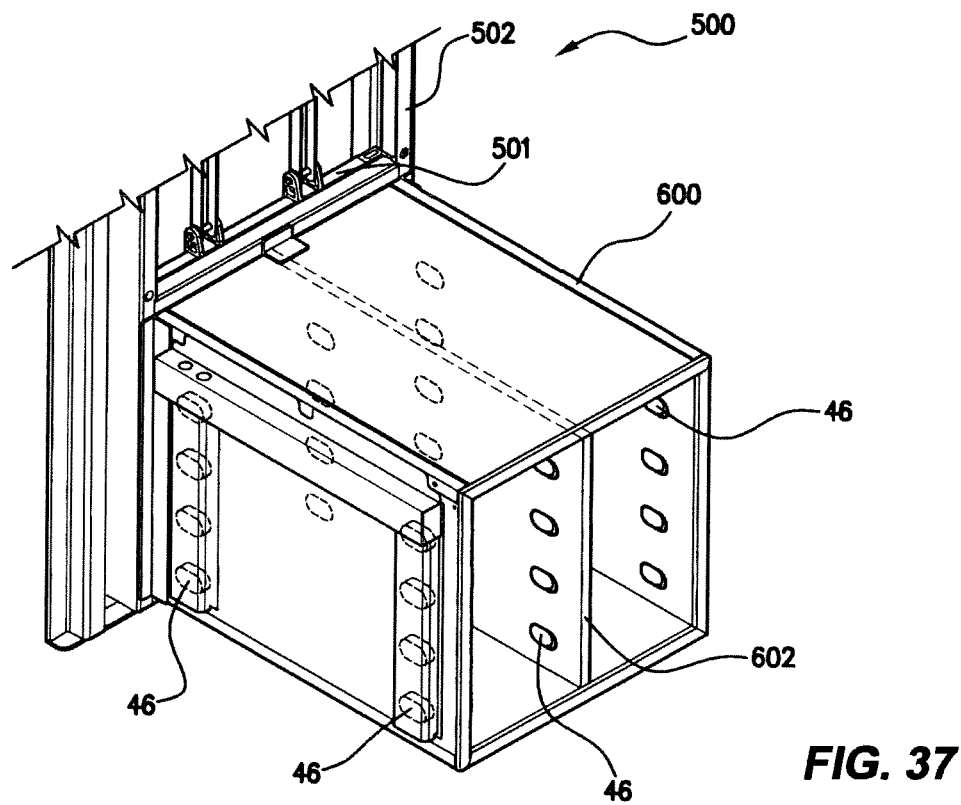
FIG. 37 is a reduced view similar to that of FIG. 28 with a divider in the measuring apparatus.
Figure 38:
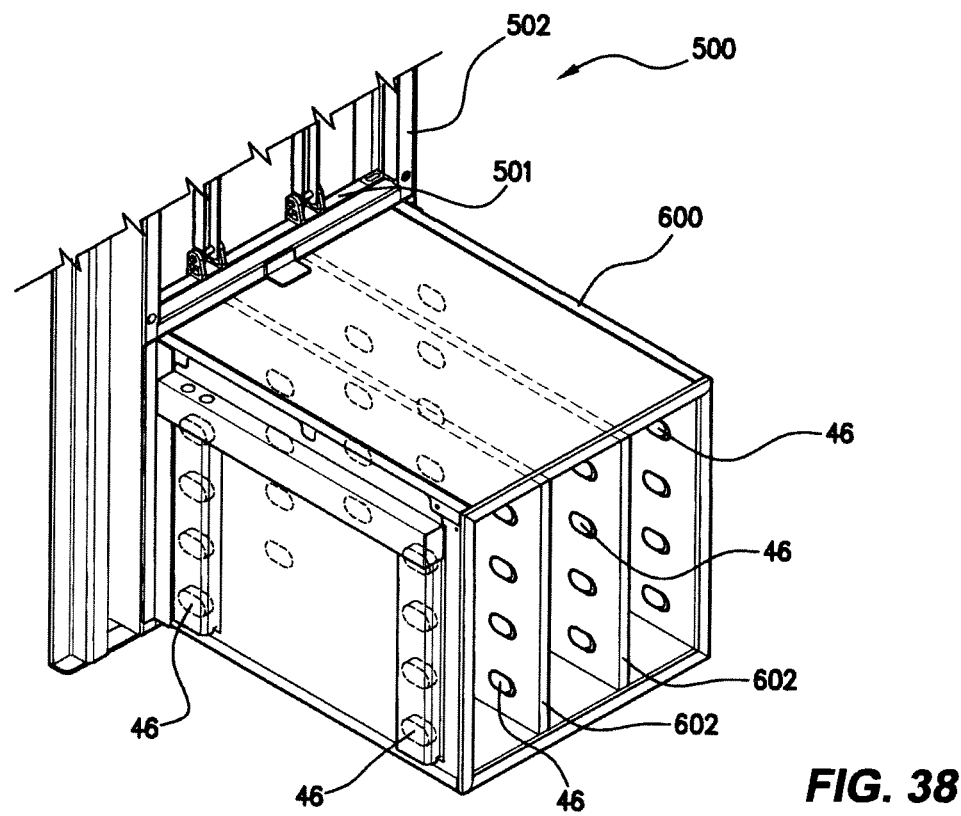
FIG. 38 is a similar view to that of FIG. 37 with 2 dividers in the measuring apparatus.

In the embodiments of FIGS. 37 and 38 there is shown a variation of the embodiment of FIG. 28 with dividers 602. FIG. 37 has a single divider 602 whilst FIG. 38 has a pair of dividers 602. The dividers 602 have a plurality of acoustic transducers 46 attached on either side which cooperate with the acoustic transducers 46 on the inner opposing walls of conduit 600. As is evident from FIG. 33 the acoustic path lengths of the embodiment shown in FIG. 28 will be reduced as the acoustic transducers of the embodiment shown in FIG. 37 will be between the divider 602 and the inner walls of conduit 600 on either side. Similarly, for the embodiment of FIG. 38 the acoustic path lengths will be further reduced because the acoustic path lengths are between the divider 602 and the inner walls of conduit 600 on either side and between the dividers 602 in the middle of conduit 600. This reduced acoustic path length will allow a reduction in the length of conduit 600. It is possible to have further dividers 602 but the cost of the additional acoustic transducers 46 would be expensive and not justifiable.

Figure 39:
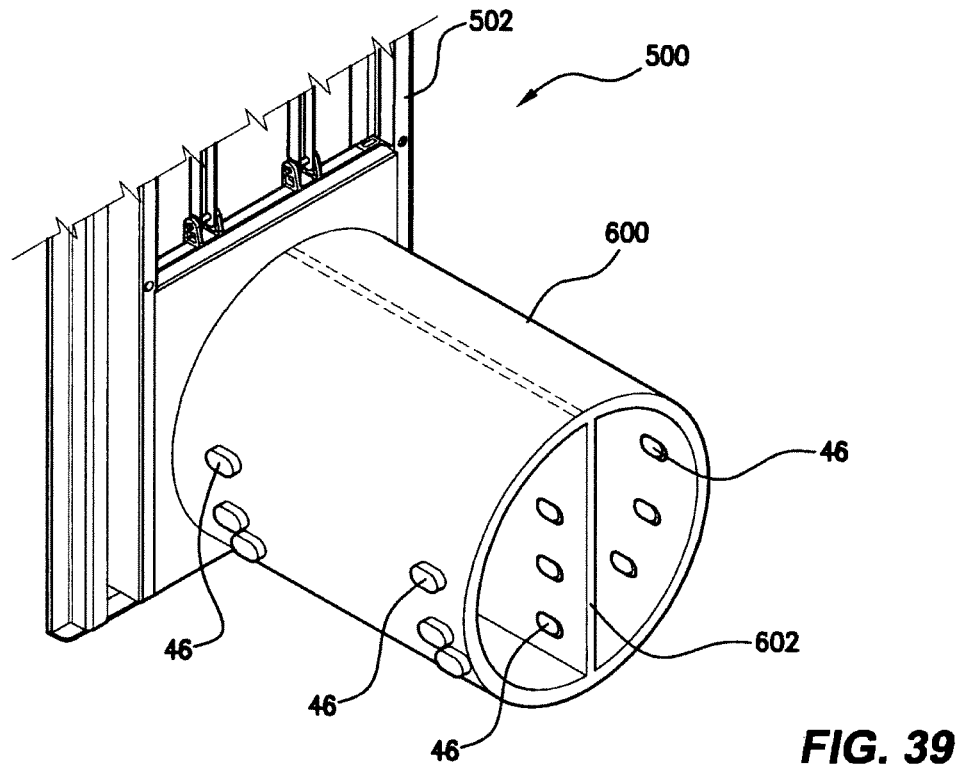
FIG. 39 is a reduced view similar to that of FIG. 29 with a divider in the measuring apparatus.
Figure 40:
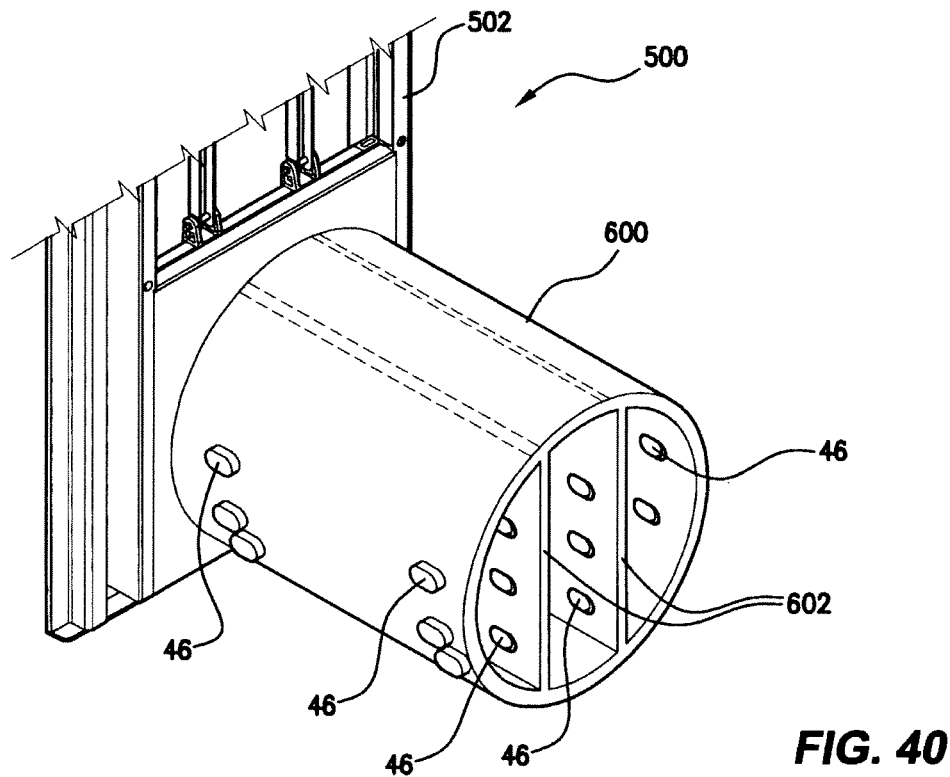
FIG. 40 is a similar view to that of FIG. 39 with 2 dividers in the measuring apparatus.

The embodiments shown in FIGS. 39 and 40 there is shown a variation of the embodiment of FIG. 29 with dividers 602. The dividers 602 operate in the same manner as that described with respect to FIGS. 37 and 38. Again the resulting reduction in acoustic path length will allow a reduction in the length of conduit 600.

Figure 41:
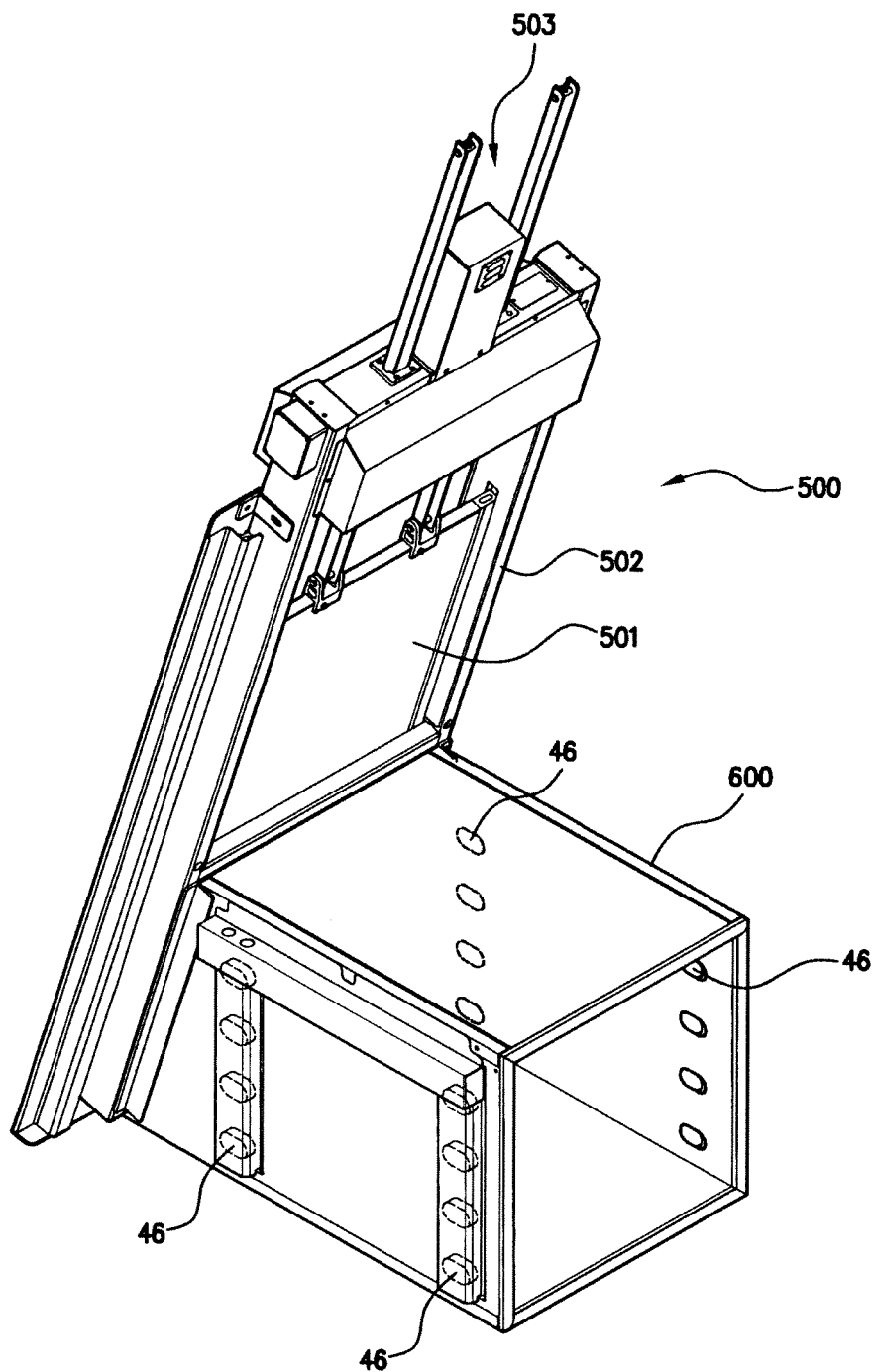
FIG. 41 is a top perspective of a flow gate similar to FIG. 28 having a slanted control gate.
Figure 42:
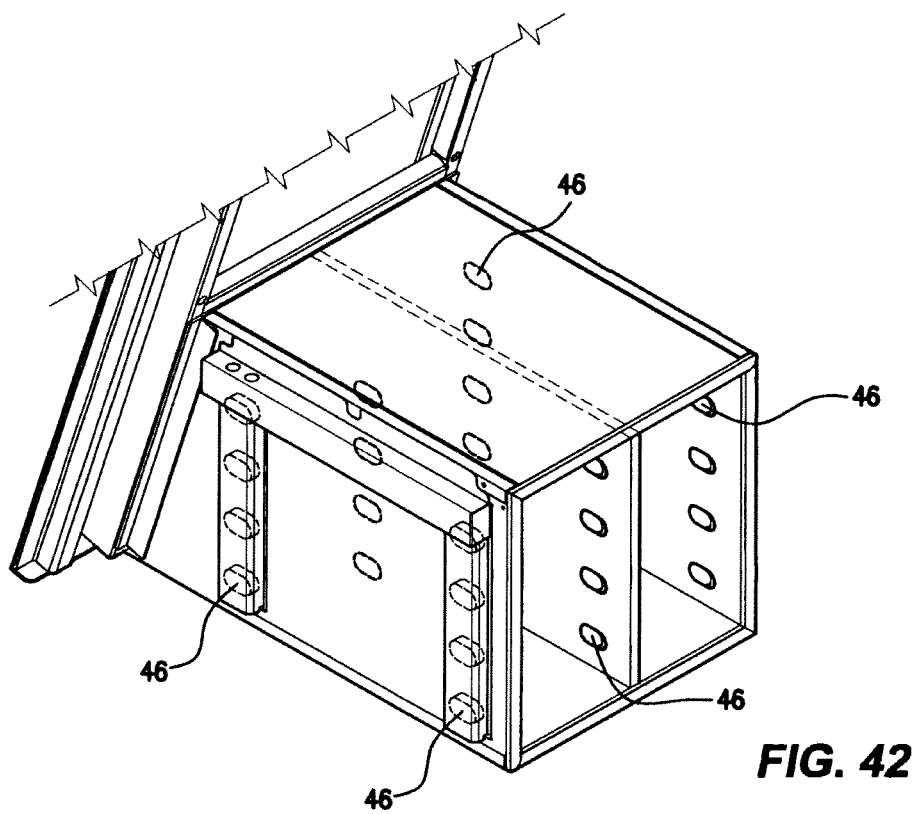
FIG. 42 is a reduced view similar to that of FIG. 41 with a divider in the measuring apparatus.
Figure 43:
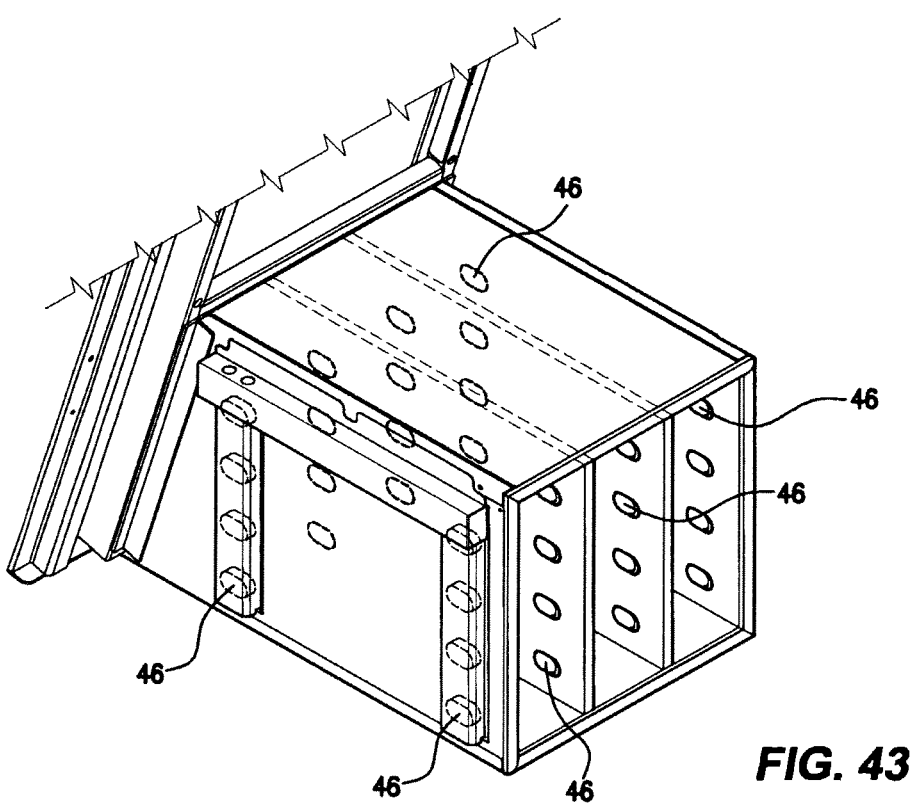
FIG. 43 is a similar view to that of FIG. 42 with 2 dividers in the measuring apparatus.

The embodiment shown in FIG. 41 is similar to the embodiment of FIG. 28. The difference between the embodiments is the slanting of the slide or control gate 500. The angling rearwardly of the slide or control gate 500 reduces the headroom required when installing the system. FIGS. 42 and 43 relate to the use of dividers 602 for the embodiment of FIG. 41 and operate identically to the embodiments of FIGS. 37 and 38 previously discussed.

Figure 44:
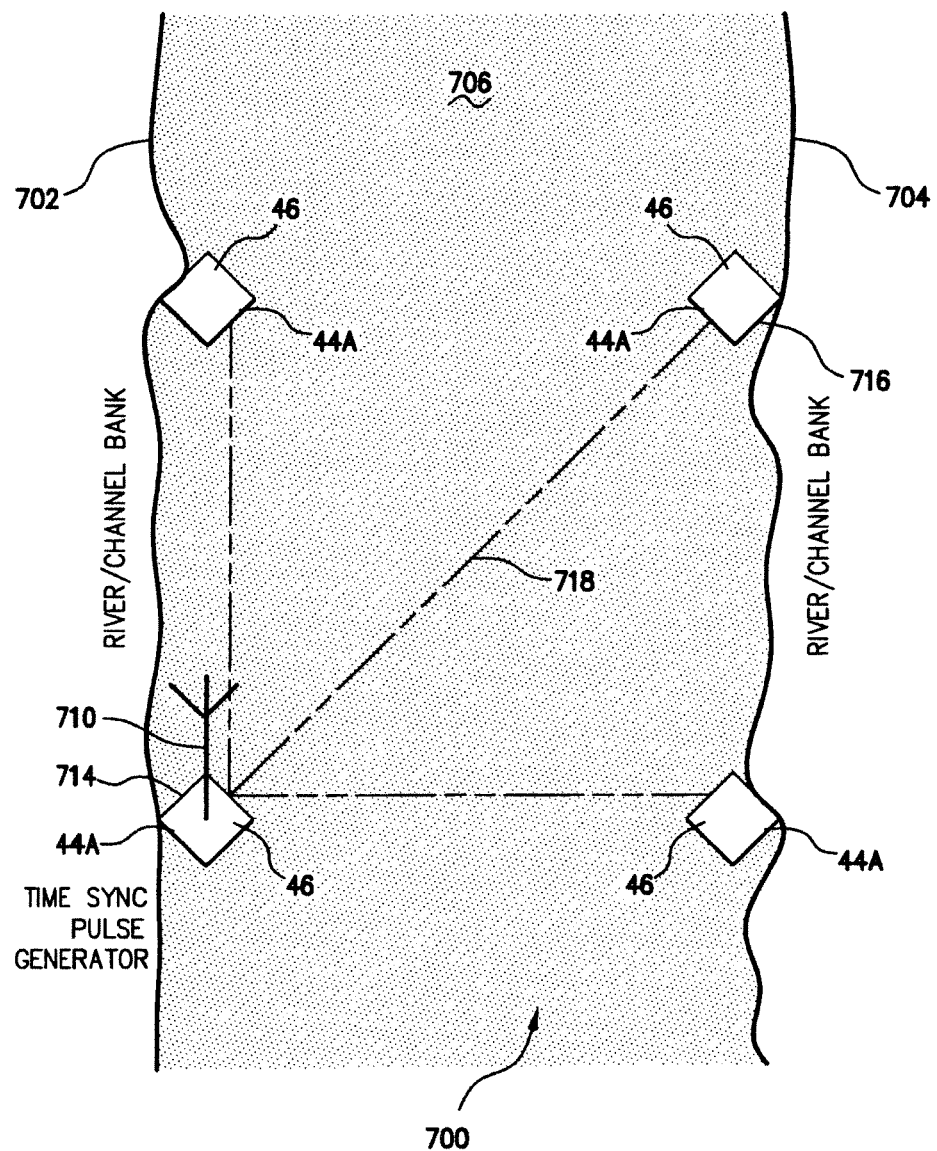
FIG. 44 is a plan view of a further embodiment to measure the acoustic travel time between transducers using a radio transmitter.
Figure 45:
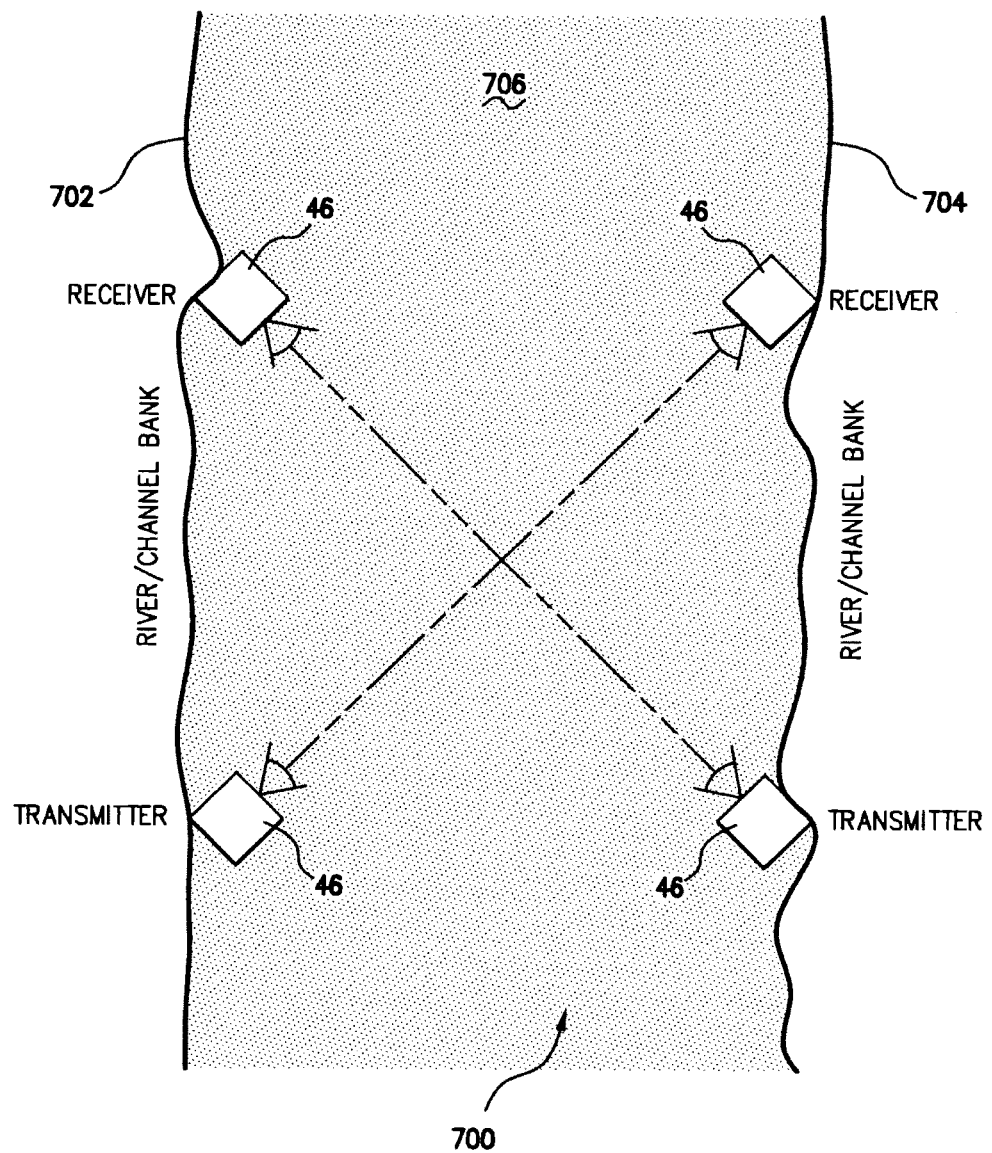
FIG. 45 is a plan view of an embodiment similar to that shown in FIG. 44 to measure the acoustic travel time between transducers using lasers.
Figure 46:
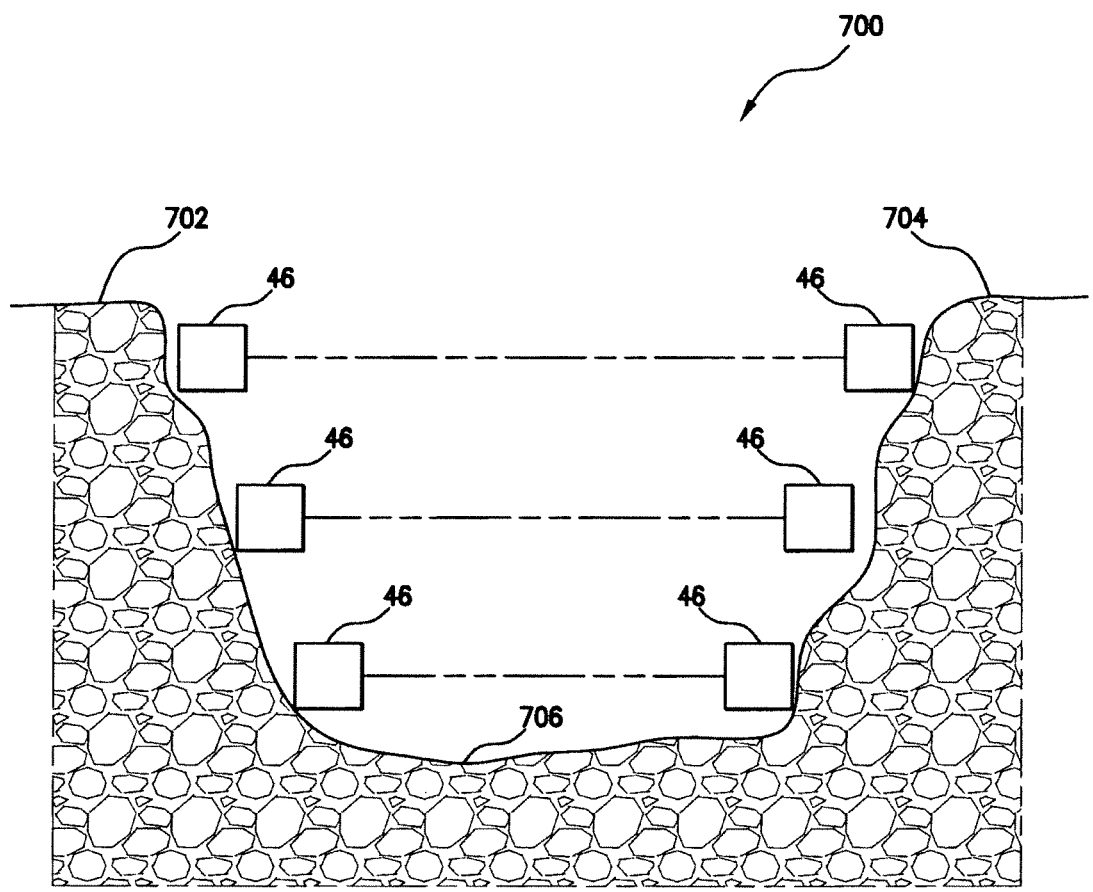
FIG. 46 is a vertical cross section of the embodiment shown in FIG. 44.

FIGS. 44 to 46 show a schematic drawing of a further measurement system in the form of an acoustic transit time flow meter designed to measure fluid flows 700 which does not require linked cabling to connect all acoustic transducers 46 to a central location. The measurement system 200 described in FIGS. 20 to 25 requires cabling which traverses opposite sides of the open channel. The system shows a left river or channel bank 702 and an opposite right river or channel bank 704. Conventionally, cabling would be required to cross the river or channel bed 706 between banks 702, 704. It may not be feasible to dig up or cut into the river or channel bed 706 to lay the required cables. This embodiment allows no cabling to be used or limit the cabling to be disposed along each of the banks 702 and 704 where it can be readily installed. Acoustic transducers 46 are schematically shown attached to the banks 702, 704 for ease of description but it is understood that they could also be contained in cartridges 44A as previously described and inserted into a flow meter assembly 20 installed in the river or channel.

In order to be self contained the cartridges 44A may contain the acoustic transducers 46 as previously described. The cartridge 44A contains the required electronics and processing circuitry and is powered by a solar panel 708. A telemetry radio 712 allows generation of RF signals which can be sent and received using data radio antenna 710. Data can also be sent to a central location for storage and further processing.

FIG. 44 shows use of the transit time flow meter where the transit time flow meter measures flows by the standard transit time method. The flow meter consists of two or more cartridges 44A which provide their own power supply 708, a shared radio communications link, the acoustic transducers 46, and a synchronising radio signal which is used to synchronise the signal sampling system clock in each cartridge 44A.

As a minimum, two cartridges 44A are installed—one on either side of each bank 702, 704. Four cartridges 44A may also be installed as shown in FIG. 44, two per side to provide the standard crossed-path metering arrangement. Further cartridge pairs may be used to provide additional velocity information within the flow channel.

The cartridge pairs 44A act alternately as an acoustic transmitter and an acoustic receiver. For example, cartridge 714 in the pair acts as a transmitter, and cartridge 716 acts as a receiver and receives the acoustic signal 718 transmitted by cartridge 714. Cartridge 714 records the time of the firing event in its high resolution timing circuitry, and cartridge 716 records the time of the receive event in its high resolution timing circuitry. The timing circuitry in each cartridge is a high speed binary counter, which is initialised to a zero value and then proceeds to count upwards. Each count in these counters is updated in a 10 pico-second period, and so a single counter increment represents a 10 pico-second duration. The transmit event is captured by circuitry in cartridge 714, and the timing count value at this instant is stored in a register in cartridge 714. The receive event is captured by circuitry in cartridge 716 and the timing count value at this instant is stored in a register in cartridge 716. However, the counter in cartridge 714 is not synchronised with the counter in cartridge 716, and so the time difference between the register value stored in cartridge 716 and cartridge 714 is indeterminate. In order to synchronise the time register value in each cartridge, an RF synchronisation pulse is transmitted from cartridge 714 to cartridge 716 prior to the firing pulse. This RF pulse travels between the two cartridges 714, 716 at the speed of light ($3\times10^8$ m/s), meaning that the time elapsed for a cartridge spacing of 100 m is 333 ns. This RF pulse is captured by both timing systems in cartridges 714, 716 and provides a common time tag with which to refer the firing event and receive event within the two cartridge timing circuits. The acoustic transit time is then calculated by subtracting the firing event time from the receive event time. The cartridges 714, 716 then swap roles and the transmitter cartridge 714 becomes the receiver cartridge and vice-versa. The acoustic transit time in the reverse direction is then calculated, allowing the differential transit time to be recorded and used to deduce flow rate through the channel.

Figure 47:
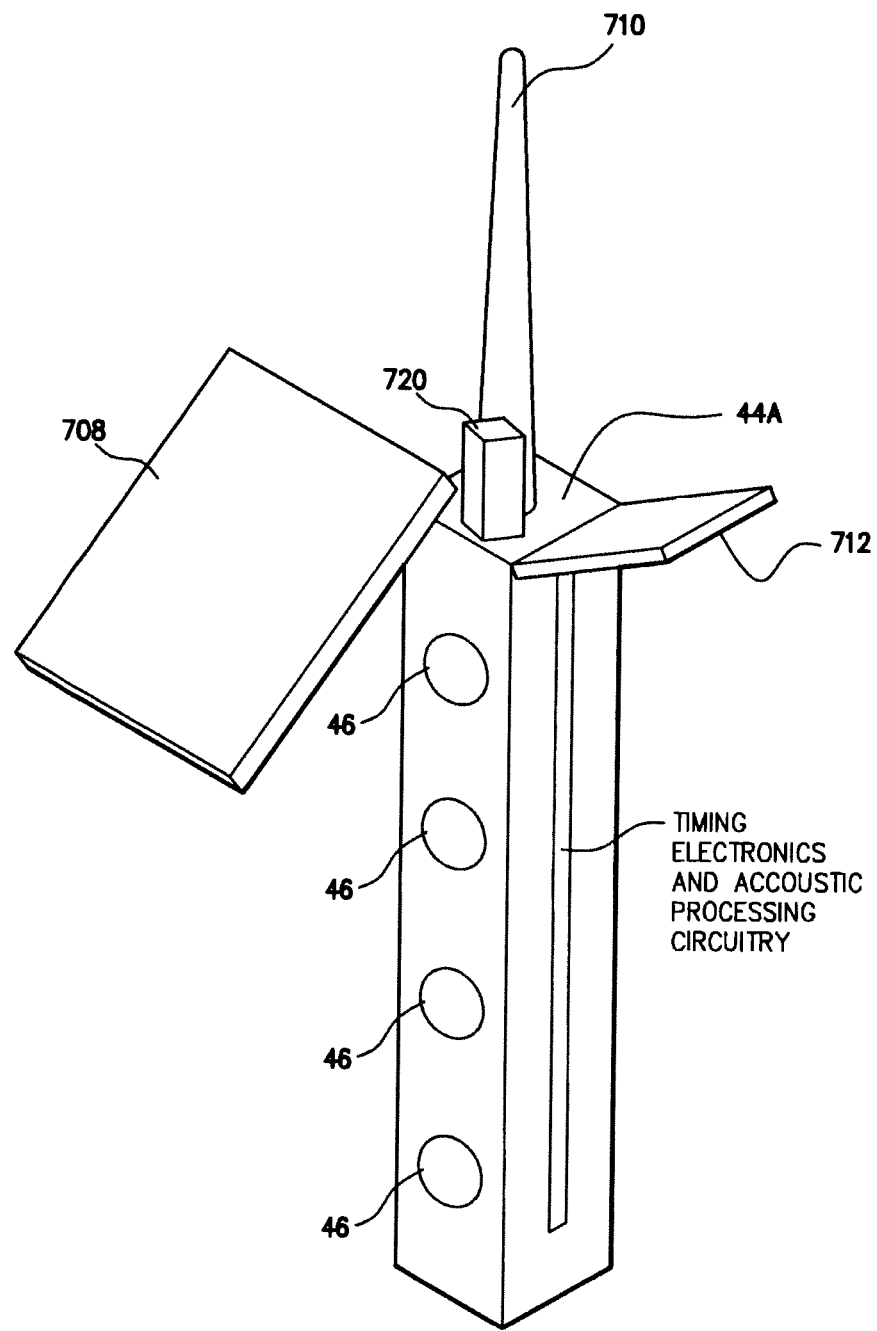
FIG. 47 is a perspective view of a sealed cartridge containing the electronics for the embodiments shown in FIGS. 44 to 46.

FIG. 45 replaces the RF system of FIG. 44 with a laser system. A sync pulse laser radio 720 (FIG. 47) could then be used as a substitute. The cartridge 44A shows both options but it is to be understood that the system can operate with only one of these options.

The invention will be understood to embrace many further modifications as will be readily apparent to persons skilled in the art and which will be deemed to reside within the broad scope and ambit of the invention, there having been set forth herein only the broad nature of the invention and specific embodiments by way of example.

We claim:

1. An acoustic flow meter assembly for a pipe, said assembly including at least three pairs of acoustic transducers, each pair of said acoustic transducers located on opposing sides of said pipe and offset longitudinally along said pipe to provide upstream and downstream transducers, each pair of acoustic transducers, in use, having their acoustic paths intersecting at a point along an axis of said pipe to provide redundancy in measuring flow through said pipe when one of said acoustic transducers fails.

2. The acoustic flow meter assembly of claim 1, wherein said acoustic paths intersecting at the point along the axis of said pipe form at least three independent flow meters.

3. The acoustic flow meter assembly of claim 2, wherein a failure of any of the at least three independent flow meters is detected in real-time.

4. The acoustic flow meter assembly of claim 3, wherein measuring the flow through said pipe is maintained until the failure is corrected.

5. The acoustic flow meter assembly of claim 1, wherein each pair of acoustic transducers includes a first acoustic transducer and a second acoustic transducer, and wherein the first acoustic transducer is diagonally directed towards the second acoustic transducer.

6. The acoustic flow meter assembly of claim 1, wherein said acoustic transducers are equispaced around a surface of a cross-section of said pipe.

7. The acoustic flow meter assembly of claim 1, wherein the at least three pairs of acoustic transducers include six pairs of acoustic transducers.

8. A method comprising:
providing at least three pairs of acoustic transducers within an acoustic flow meter assembly for a pipe, each pair of said acoustic transducers located on opposing sides of said pipe and offset longitudinally along said pipe to provide upstream and downstream transducers;
measuring flow through said pipe using the acoustic flow meter assembly; and
providing redundancy in measuring the flow through said pipe when one of said acoustic transducers fails, the redundancy being provided based on each pair of acoustic transducers, in use, having their acoustic paths intersecting at a point along an axis of said pipe.

9. The method of claim 8, further comprising:
forming at least three independent flow meters based on said acoustic paths intersecting at the point along the axis of said pipe.

10. The method of claim 9, further comprising:
detecting in real-time a failure of any of the at least three independent flow meters.

11. The method of claim 10, further comprising:
maintaining one or more measurements of the flow through said pipe until the failure is corrected.

12. The method of claim 8, wherein each pair of acoustic transducers includes a first acoustic transducer and a second acoustic transducer, and wherein the first acoustic transducer is diagonally directed towards the second acoustic transducer.

13. The method of claim 8, wherein said acoustic transducers are equispaced around a surface of a cross-section of said pipe.

14. The method of claim 8, wherein the at least three pairs of acoustic transducers include six pairs of acoustic transducers.

* * * * *